Aug. 28, 1945. H. R. RAFTON 2,383,509
TREATMENT OF PIGMENT COMPRISING CALCIUM CARBONATE
Filed March 25, 1942
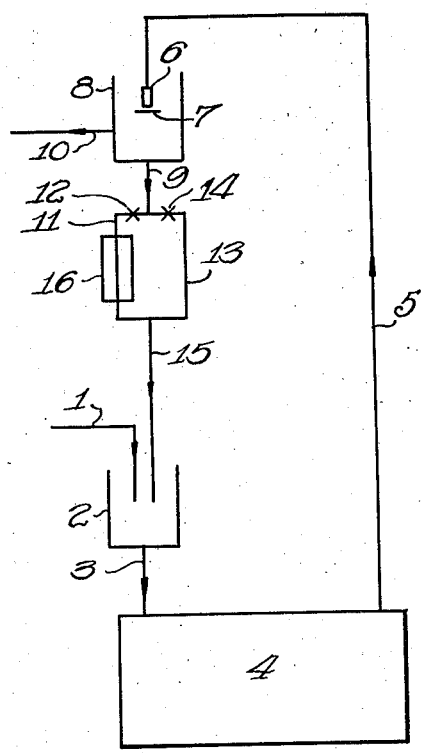
Inventor
HAROLD R. RAFTON
By C. R. Parker
Attorney Patented Aug. 28, 1945

2,383,509

UNITED STATES PATENT OFFICE 2,383,509

TREATMENT OF PIGMENT COMPRISING CALCIUM CARBONATE

Harold R. Rafton, Andover, Mass., assignor to Raffold Process Corporation, a corporation of Massachusetts Application March 25, 1942, Serial No. 436,196

8 Claims. (Cl. 106—306)

My invention relates to the treatment of pigment, more particularly artificially prepared calcium carbonate.

The principal object of my invention is the treatment of a pigment, particularly artificially prepared calcium carbonate, to impart specific and controlled characteristics, and the pigment so produced.

Other objects and advantages of this invention will become apparent during the course of the following description.

Calcium carbonate may be artificially prepared in a variety of ways, all of which are well known. Examples of some of the common methods are: by reaction of lime, or calcium hydroxide, and carbon dioxide; by the causticizing reaction, e. g. the reaction of sodium carbonate and lime; by the reaction of an alkali metal carbonate such as sodium carbonate and a soluble calcium salt such as calcium chloride; by the elimination of carbon dioxide from calcium bicarbonate solution by heat or reduction of pressure, or by reaction of calcium bicarbonate with lime; or by any combination of the above. Sodium bicarbonate is sometimes utilized in the reaction, as is also potassium or ammonium carbonate, and sodium, potassium or ammonium hydroxide may be present in certain cases. When I speak of artificially prepared calcium carbonate, I mean calcium carbonate artificially prepared by the above mentioned or other known methods in contradistinction to naturally occurring calcium carbonate, such as marble, limestone and natural chalk, marl, or refined forms thereof such as the comminuted form, usually ground, which may be subjected to mechanical, air or water separation or classification, and may be otherwise purified if desired.

The calcium carbonates artificially prepared vary considerably in physical characteristics and possibly also in chemical constitution and crystalline form or other form. Some may be relatively coarse in particle size, others may be relatively fine, examples of the latter being the calcium carbonates made by the processes disclosed in the patents issued to Rafton and Brooks, No. 2,058,503, of October 27, 1936, and No. 2,062,255, of Nov. 24, 1936. In many instances a given calcium carbonate, although entirely satisfactory from the standpoint of certain characteristics such for example as particle size, alkalinity, softness and the like, may be unsatisfactory because of high adhesive requirement, high oil absorption, or other characteristic. In many cases such unsatisfactory characteristic makes it infeasible, if not impossible, to market a calcium carbonate otherwise satisfactory or highly desirable for certain uses, or if possible to market it at all, only at a price lower than it would otherwise command.

As disclosed in my copending application Serial No. 346,661 filed July 20, 1940, I have discovered that by the momentary application of pressure, in certain cases accompanied by momentary attrition, I am able to impart to artificially prepared calcium carbonate not possessing the same, characteristics hitherto impossible of acquirement or if hitherto possible of acquirement by other methods, only at a great expense, and have produced artificially prepared calcium carbonate with certain new and in some cases unique characteristics.

I have also discovered that by the passage of artificially prepared calcium carbonate at high velocity through a nozzle and if desired against a target, I am also able to impart to artificially prepared calcium carbonate not possessing the same, characteristics hitherto impossible of acquirement, or if hitherto possible of acquirement by different methods, only at considerable expense, or to a relatively minor degree; and I have produced artificially prepared calcium carbonate with modified and in some cases unique characteristics.

For example, by my process I have been able to reduce greatly the adhesive requirements of artificially prepared calcium carbonates, when used, for example, in coated paper or in water paints. By my process, I have also been able to reduce the oil absorption of artificially prepared calcium carbonates, when used for instance in paints, enamels and other coatings, and putties; and in general have been able to impart greatly improved qualities to artificially prepared calcium carbonates.

In my above referred to copending patent application, I have described the application of the process thereof to dry material, to somewhat moist material, to material in paste form, and even to material in the form of a slurrry; but as stated therein, the application of the process to material in paste form and more particularly to material in slurry form is much more difficult than to material in a form containing less water, and requires specially devised technique and apparatus disclosed therein. In other words, the application of my prior disclosed process becomes increasingly difficult as the water content of the artificially prepared calcium carbonate is increased above certain limits. My present process, on the other hand, is particularly applicable to aqueous slurries of artificially prepared calcium carbonate, but becomes increasingly difficult of operation as the water content of the artificially prepared calcium carbonate is decreased below certain limits, e. g. as the material approaches the paste-like condition, and as a matter of fact, my preferred method of operating my present process is on an aqueous slurry, preferably as thick as may flow or as it may be feasible to pump.

It is thus seen that, in a sense, my present process is complementary to the process of my above mentioned copending application, and while either process may be used, the water content of the artificially prepared calcium carbonate to be treated may determine which process is the better adapted under any given circumstances.

My present process, however, because it is capable of treating slurries so readily, lends itself particularly to incorporation in the operation of manufacturing artificially prepared calcium carbonate, inasmuch as in most cases the calcium carbonate after manufacture exists either in the form of a slurry, or as a paste such as a filter cake which can very readily be diluted into a slurry; and as my process may be made continuous if desired, and requires very little attention once it has been put into operation, being practically automatic, it may be added to the manufacturing operation as an additional step practically without complication or additional labor requirement. Furthermore, in certain instances, there may be a point in the manufacturing operation in which artificially prepared calcium carbonate, after it has been produced, may be present in a somewhat crude form requiring subsequent refining, purification or the like. It is very often entirely feasible to incorporate my process as a step in the operation at some such point after the artificially prepared calcium carbonate has been formed, and thereby when carrying out my process to avoid, for example, the necessity of the dilution of a filter cake to a slurry at the end of the operation, providing that such dilution would be disadvantageous, such as it might be in the case where the product was to be subsequently used in paste form or dried.

It is to be understood, however, that the usefulness of my process is not limited to the above examples of its use, as of course artificially prepared calcium carbonate previously made, existing, for example, either in dry, paste or slurry form, can be treated thereby. For example artificially prepared calcium carbonate procured in a dry form, may be wetted up to a slurry, subjected to my process, and subsequently dried before use. Or artificially prepared calcium carbonate procured in dry form, but used in wet form, such as may be the case in the paper industry, either in filled or coated paper, may be made up into a slurry of appropriate concentration with water, subjected to my process, and the calcium carbonate slurry either as such, or with subsequent dilution or concentration as desired, may then be employed in the use for which it is intended. Or of course a paste properly diluted to a slurry, or a slurry may be used. The great adaptability, utility and economy of operating my process is thus readily apparent.

I have stated above that artificially prepared calcium carbonate may be made in a variety of ways, and have given illustrations of methods of its preparation. Calcium carbonate prepared by artificial methods responds to my process, those methods given being illustrative examples of artificially preparing calcium carbonate. Artificially prepared calcium carbonates of all degrees of fineness respond to my process, from coarse particle size through varying degrees of fineness up to such fineness that they may be said to approach or be in the colloidal condition. Naturally, however, the absolute magnitude of the effect obtained is not the same or even similar with every sample, but varies according to the method of manufacture of the calcium carbonate, conditions under which it is produced, conditions of treatment and the other variables involved. Pigments comprising artificially prepared calcium carbonate, such for example as calcium carbonate magnesium hydroxide and calcium carbonate magnesium basic carbonate, also respond to my process. On the other hand, naturally occurring carbonates, such as limestone, marble, marl and chalk, all for example in comminuted form such as they occur commercially, do not respond to my process. These latter materials appear to be affected by my process either not at all, or if at all, in no substantial degree.

In carrying out my present invention I provide an aqueous slurry comprising artificially prepared calcium carbonate, preferably of relatively high concentration, and cause it to pass through a nozzle at high velocity. If desired I may cause the jet of slurry to impinge against a target. The target may be stationary, or may be moving at slow or high velocity as desired, preferably in a direction opposed to the jet direction, in the case of a high velocity target moving in an opposed direction, an effect of greater magnitude being obtained.

More specifically illustrating a method of carrying out my present invention, a pump capable of pumping a slurry under high pressure may be employed. The slurry is fed to the inlet of the pump and the outlet of the pump is suitably fitted with a nozzle. The discharge of the slurry under high pressure through the nozzle causes the slurry to pass through the nozzle at high velocity which effects a substantial change in the characteristics of the artificially prepared calcium carbonate, for example, it reduces its adhesive requirement. It also reduces its oil absorption and changes certain other of its properties. The methods of testing for adhesive requirement and oil absorption of the artificially prepared calcium carbonate are essentially similar to those employed in my above referred to copending application, and will be referred to later herein.

The word "nozzle" is sometimes used as being restricted to one of circular cross section and of tapered longitudinal section. However, I do not use the word in such restricted sense, as the nozzle I may employ may be of any desired cross section and/or longitudinal section, for example, its cross section may be of circular, square, rectangular, oval, irregular, annular or of any other desired shape, and its longitudinal section may be tapered in either or both directions, parallel sided, irregular, have a rounded portion at its end as in a "ring" nozzle, be multi-passaged, e. g. as in an annular nozzle, or of any other shape desired, some of these being described later herein. The length of the channel of the nozzle may be in any relation to the area, diameter or other dimension of the nozzle orifice, from one very long in proportion to the diameter, to one very short in proportion to the diameter, even down to the point of employing as a nozzle an orifice plate, which has substantially little or no length of channel. Moreover, the orifice or orifices of the nozzles I use have a fixed substantially non-yielding boundary and are not subject to any substantial change in size with change in pressure, but of course this is not meant to exclude nozzles with orifice or orifices which, though their boundary is fixed and substantially non-yielding, may be adjustable, such for example as annular nozzles with adjustable cores, for example with shells and cores of a slightly tapered shape, in which the cores can be advanced or retracted in the shell as by a screw thread either to compensate for wear, or to change the size of the annulus if desired. Thus in my use of the word "nozzle," I mean it to be broadly interpreted as indicated above, with the limitation noted as to its orifice having a fixed substantially non-yielding boundary.

For the purpose of illustrating the results obtained by the use of my invention I shall cite a number of tests I have conducted. In conducting these series of tests, I employed a horizontal triplex plunger pump having a maximum capacity of approximately 1¼ gallons per minutes and capable of exerting pressure in the range from 0 to approximately 5000 lbs. per sq. inch. To the outlet of the pump was connected a ⅜" steel pipe, capable of withstanding the highest pressure given by the pump, at the end of which was a ⅜" pipe coupling, into which, for experimental purposes, could be connected any one of a number of nozzles of a wide variety of sizes, shapes and types, and to the outside of which coupling could also be connected, if desired, a stationary target against which the issuing jet would impinge. As the nozzle used was in most cases designed to take less than the full capacity of the pump at any given pressure, a by-pass was provided whereby the required quantity of the slurry at the pressure of the pump could be passed from the system through an overflow controlled by a valve and by the regulation of this valve and thus the amount of overflow, the desired pressure could be maintained.

As an example of the effect obtained by passing a slurry of a pigment comprising artificially prepared calcium carbonate through a nozzle at high velocity, I cite the test in Table I, made with the apparatus described above. No target was employed, the material being caught in a container at some distance (8 feet) from the nozzle orifice at a point where the velocity of the discharging jet had been very greatly if not substantially entirely spent. The pigment comprising the artificially prepared calcium carbonate was in this case a sample of commercial calcium carbonate magnesium hydroxide obtained by causticizing sodium carbonate with slaked dolomitic lime. As produced commercially, it was in the form of a paste-like pulp containing approximately 50% of water, which was diluted for the purpose of the test by incorporating water therewith to give a slurry of 224 grams per litre. The nozzle employed was an orifice plate, consisting of a thin steel plate in which had been drilled a circular hole .0245" in diameter, the inner edge of the hole being a sharp 90° edge and the outside face of the plate (toward the atmosphere) being bevelled at the edge of the hole. An absolutely sharp edge could not be conveniently used because it would tend to break off or quickly abrade under the pressure employed. The actual length of the cylindrical channel of the nozzle between the inner sharp edge and the outer bevel edge was, however, approximately the minimum under the circumstances, and by measurement was found to be only .012" in length, which for all practical purposes could thus be considered to be an orifice with a perfectly sharp edge, that is, a nozzle having substantially no length of channel. The speed of the issuing jet in feet per second in Table I (as in all subsequent tables) was computed by dividing the actual measured discharge from the nozzle per second by the cross sectional area of the nozzle channel. In the case where the nozzle was an orifice plate as in Table I, this figure is probably somewhat in error due to the naturally occurring restriction of the cross sectional area of the stream beyond the orifice ("vena contracta"), but where the nozzle channel was at least 3 to 6 nozzle diameters long, this figure is thought to be reasonably accurate. (The individual illustrative tests reported herein will be serially numbered for convenience in referring thereto.)

Table I

| Test No. | Pressure, lbs. per sq. inch | Speed of issuing jet, ft. per sec. | Adhesive requirement, percent | Per cent reduction in adhesive requirement, based on original as 100% |
|---|---|---|---|---|
| 1 | | | 22 | |
| 2 | 4,000 | 532 | 18 | 18 |

In Table I, Test No. 1 with no pressure reading was the original pigment prior to submission to the process (as are similar tests in all succeeding tables), and Test No. 2 was the pigment after processing. It will be seen that, under the conditions of the test, the adhesive required was reduced 18%, based on the amount of adhesive required by the original pigment before treatment. The adhesive used in the test of the above table, as well as in the tests of all other tables herein, was casein dissolved in aqueous alkaline solvent.

In another series of tests, cited in Table II, the effect of the length of the nozzle channel was determined, employing as the nozzles pieces of a steel tube, in lengths varying from ⅛" to 37", with a cylindrical channel having a diameter of .0232". The same original sample of calcium carbonate magnesium hydroxide was used for this series of tests as for that in Table I, but at a slightly different concentration, namely, at 222 g. p. l.

Table II

| Test No. | Pressure, lbs. per sq. inch | Speed of issuing jet, ft. per sec. | Length of nozzle channel, in inches | Adhesive requirement, per cent | Per cent reduction in adhesive requirement, based on original as 100% |
|---|---|---|---|---|---|
| 1 | | | | 22 | |
| 3 | 4,000 | 660 | ⅛ | 21 | 5 |
| 4 | 4,000 | 615 | ¼ | 19 | 14 |
| 5 | 4,000 | 583 | ½ | 20 | 9 |
| 6 | 4,000 | 548 | 1 | 17 | 23 |
| 7 | 4,000 | 438 | 2 | 19 | 14 |
| 8 | 4,000 | 298 | 5 | 17 | 23 |
| 9 | 4,000 | 195 | 10 | 18 | 18 |
| 10 | 4,000 | 122 | 20 | 17 | 23 |
| 11 | 4,000 | 103 | 37 | 17 | 23 |

It is seen from Table II that, in general, employing nozzles with a channel of this diameter, and with a length up to approximately 1", the results improve somewhat as the length of the channel increases, but with a length over 1", the results remain fairly constant even up to the length of 37".

The explanation for this is thought to be as follows: the results appear to be obtained by passing the pigment through the nozzle at a high rate of speed, the higher the speed with a nozzle channel of a given length, the better the results. Owing to the frictional resistance of the slurry passing through the channel, the speed of flow is very materially slowed down with increase in the length of the channel (as seen in Table II above), and apparently there is a definite length (for any given diameter of channel) when the improvement obtained by the increase in length is balanced by the lesser effect of the slower speed of passage on the pigment passing through the channel.

Another series of tests was made to determine the general influence of the diameters of the channels of the nozzles employed, the nozzles in this series also having cylindrical channels. For this purpose, to compare with Test No. 5 (of Table II), in which was employed a nozzle having a channel ½" long and .0232" in diameter, two steel nozzles having ½" long channels were employed, one having a channel diameter of .0174" and the other having a channel diameter of .0131". For this series of tests, the same original sample at the same concentration was used as was employed for Test No. 5. This series of tests is cited in Table III.

*Table III*

| Test No. | Pressure, lbs. per sq. inch | Diam. of nozzle channel in inches | Speed of issuing jet, ft. per sec. | Adhesive requirement, per cent | Per cent reduction in adhesive requirement, based on original as 100% |
|---|---|---|---|---|---|
| 1 | | | | 22 | |
| 5 | 4,000 | 0.0232 | 583 | 20 | 9 |
| 12 | 4,000 | .0174 | 493 | 18 | 18 |
| 13 | 4,000 | .0131 | 510 | 18 | 18 |

It is seen from Table III that for the same length of channel the results appear to be somewhat better when using nozzles with smaller diameter channels. This was found to be true also from the employment of nozzles with channels larger than the .0232" diameter channel of Test No. 5, which were found in general to give somewhat poorer results as the size of the channel increased.

As indicated above, nozzles of other types than those having cylindrical channels may be used in the practice of my invention. This is illustrated in a series of tests made with a nozzle having an annular channel, that is, a channel the cross section of which was an annulus. The channel of this nozzle was the space between a solid cylindrical core of steel rigidly centered inside a cylindrical steel shell, the circumference of the core being taken as the width of the channel and the distance between the core and the shell along a radius being taken as the thickness of the channel. The interior of the shell was very carefully machined and then reamed to give the exact diameter desired, while the core was also very carefully machined and then ground and polished also to give the exact diameter desired. A series of tests, made with nozzles of this type of different lengths, are cited in Table IV below, the dimensions of the individual nozzles used as to width, thickness, and length of channel, all being given in the table. The pigment employed for this test was the same as that employed in the tests of the previous tables, at a concentration of 215 g. p. l. The speed of issuing jet is not given as it could not be computed accurately owing to the fact that a continuous annular stream did not issue from the nozzle, doubtless due to plugging of the nozzle channel, but rather a stream broken into several jets of indefinite size and shape.

*Table IV*

| Test No. | Pressure, lbs. per sq. inch | Thickness of annular channel, inches | Width of annular channel, inches | Length of annular channel, inches | Adhesive requirement, per cent | Per cent reduction in adhesive requirement, based on orig. as 100% |
|---|---|---|---|---|---|---|
| 1 | | | | | 22 | |
| 14 | 4,000 | 0.0014 | 1.367 | ⅜ | 20 | 9 |
| 15 | 4,000 | .0018 | 1.367 | 1 | 16.5 | 25 |
| 16 | 4,000 | .0018 | 1.367 | 1¹⁵⁄₁₆ | 18 | 18 |
| 17 | 4,000 | .0018 | 1.367 | 4 | 18 | 18 |
| 18 | 4,000 | .0018 | 1.367 | 7⅜ | 19 | 14 |

From Table IV, it is noted that, similar to the results shown in Table II, the effect improves with the length of the channel up to about 1", but unlike in Table II, the effect drops off somewhat with increased length of channel above 1". The difference is thought probably to be due to a greater drop in speed of the issuing jet with the small increase in channel length than should theoretically be the case if only the increased frictional resistance of the channel surface were considered, owing to the fact that annular nozzles, as indicated above, have a decided tendency toward becoming plugged which naturally increases their frictional resistance.

The tests cited in the above tables will suffice to illustrate the effect in reduction of adhesive requirement resulting from passage of a pigment comprising artificially prepared calcium carbonate through a nozzle at a substantial velocity.

As stated above, I may, if I desire, cause the jet issuing from the nozzle to impinge against a target. As also stated, the target may be stationary or may be moving preferably in a direction in opposition to that of the jet at slow or high velocity as desired, in the latter case an effect of greater magnitude being obtained. Although such a target, for example a rotating target, gives excellent results, a stationary target, because of its simplicity, is sometimes more convenient to use. A target moving very slowly in a plane substantially at right angles to the jet is an adaptation of the stationary target which is convenient for commercial use because, as explained later in detail, such a target continually or continuously offers an unworn target surface to the jet. Extensive tests prove that the adaptation of my method employing a target is a very effective one. The effect of the target appears to vary with the speed of the issuing jet, in general the higher the speed, the better the results; and contrary to the case where a nozzle is used without a target, where the intensity of the effect produced, for example by a cylindrical channel nozzle, becomes somewhat less with the increase in diameter of the channel, the channel diameter of the nozzle appears to have little or no influence on the intensity of the effect obtained when a target is employed (except for an extremely fine nozzle diameter where the intensity of the effect appears to be somewhat greater).

It is apparent that a number of different types of apparatus may be used for this purpose, but as specifically illustrating this method, there are cited a number of series of tests made with the pump such as employed for the tests shown in the tables above, equipped with a nozzle and additionally equipped with a flat stationary target arranged with its surface substantially at right angles to the direction of the issuing jet. The nozzle employed for Test No. 19 was the orifice plate with a circular hole .0245" in diameter, described just prior to Table I above, and which was used in Test No. 2. The target employed was a piece of flat steel approximately ¾" square held rigidly ¼" from the end of the nozzle. The pigment comprising artificially prepared calcium carbonate was the same material, at the same concentration, described as used in Test No. 2 in Table I. Table V shows the results of the test with this nozzle using the target described, and also includes Test No. 2 for convenience in comparison.

*Table V*

| Test No. | Pressure, lbs. per sq. inch | Speed of issuing jet, ft. per sec. | Adhesive requirement, per cent | Per cent reduction in adhesive requirement, based on orig. as 100% |
|---|---|---|---|---|
| 1 | | | 22 | |
| 2 | 4,000 | 532 | 18 | 18 |
| 19 | 4,000 | 532 | 15 | 32 |

In Table V, comparing the result of Test No. 19 with that of Test No. 2, which is directly comparable therewith, the only difference being the additional use of the target in Test No. 19, it is noted that the adhesive requirement when employing the target is 15% as against 18% without the employment of the target, and the per cent reduction in adhesive requirement based on original as 100%, is 32% in the case where a target is employed and 18% where a target is not employed, showing the improved results when a target is employed.

Further to illustrate the effect of the employment of a target, a series of tests is cited which is comparable with the series shown in Table II, wherein the effect on pigment comprising artificially prepared calcium carbonate by passage at 4000 lbs. pressure through nozzles of different lengths is shown. The present series of tests was made under the same conditions as the series shown in Table II, with the exception that in the present series the target described as being used in Table V was additionally employed. Table VI shows the results of these tests, in conjunction with the tests from Table II in order to provide ready comparison of the two series of tests.

*Table VI*

| Test No. | Pressure, lbs. per sq. inch | Speed of issuing jet, ft. per sec. | Vol. jet, c. c. per min. | Length of nozzle channel, inches | Use of target | Adhesive requirement, per cent | Per cent reduction in adhesive requirement, based on orig. as 100% |
|---|---|---|---|---|---|---|---|
| 1 | | | | | | 22 | |
| 3 | 4,000 | 660 | 3,295 | ⅛ | No | 21 | 5 |
| 20 | 4,000 | 660 | 3,295 | ⅛ | Yes | 16½ | 25 |
| 4 | 4,000 | 615 | 3,075 | ¼ | No | 19 | 14 |
| 21 | 4,000 | 615 | 3,075 | ¼ | Yes | 17 | 23 |
| 5 | 4,000 | 583 | 2,920 | ½ | No | 20 | 9 |
| 22 | 4,000 | 583 | 2,920 | ½ | Yes | 17 | 23 |
| 6 | 4,000 | 548 | 2,740 | 1 | No | 17 | 23 |
| 23 | 4,000 | 548 | 2,740 | 1 | Yes | 17 | 23 |
| 7 | 4,000 | 438 | 2,190 | 2 | No | 19 | 14 |
| 24 | 4,000 | 448 | 2,245 | 2 | Yes | 17 | 23 |
| 8 | 4,000 | 298 | 1,486 | 5 | No | 17 | 23 |
| 25 | 4,000 | 287 | 1,435 | 5 | Yes | 17 | 23 |
| 9 | 4,000 | 195 | 975 | 10 | No | 18 | 18 |
| 26 | 4,000 | 184 | 921 | 10 | Yes | 17 | 23 |
| 10 | 4,000 | 122 | 608 | 20 | No | 17 | 23 |
| 27 | 4,000 | 122 | 608 | 20 | Yes | 17 | 23 |
| 11 | 4,000 | 103 | 515 | 37 | No | 17 | 23 |
| 28 | 4,000 | 103 | 515 | 37 | Yes | 17 | 23 |

An examination of Table VI indicates that with nozzles of the diameter employed, within a range of nozzle length of ⅛" to 37", the results obtained when a target is employed (target distance ¼") appear to be substantially independent of the length of the nozzle. It was seen, however, from Table II that the results without a target improve with increase in nozzle length up to about 1", but from there on the results remain substantially uniform up to 37", the probable explanation of this situation being given in the second paragraph directly under Table II above. In comparing the results on the same nozzles with and without targets in Table VI, it is seen that the shorter nozzles give better results with a target but as longer nozzles are employed, the use of a target in this series does not appear to offer any advantage over the operation without a target. This is probably due to the fact that the effect obtained with a target, as stated above, increases with the speed of the issuing jet, and as seen from Table VI, the speed of the issuing jet falls off sharply with the increase in the length of the nozzle due to the frictional resistance of the nozzle. Thus the ultimate result, which is the combined effect of the passage through the nozzle plus the impingement on the target, and which for the shorter nozzles, at least for those of small channel diameter, is contributed to in a considerable measure by each of the two factors, becomes increasingly the contribution of the passage through the nozzle and decreasingly the contribution of the impingement on the target as the nozzle length increases. Thus as a nozzle of given diameter is increased in length, a length is arrived at, at which the use of the target contributes little or nothing to the final result. This is a length where the nozzle is sufficiently long that friction has reduced the speed of the issuing jet sufficiently so that the effect of impingement on the target is substantially negligible in relation to the effect obtained by passage through the nozzle.

Therefore it might appear that, for nozzles of small channel diameters, if the nozzle were made long enough, the target might be dispensed with to advantage as requiring less complication; but this supposition is erroneous because the use of a target actually presents practical advantages. In the first place, very much shorter nozzles may be used to obtain the same results when a target is employed than when a target is not employed which results in the use of very much cheaper nozzles. Secondly, and very important, when using nozzles of small channel diameters, is the greater capacity of the system which may be obtained when using a target in obtaining a given result. This is because the jet issuing from a nozzle of given channel diameter at a higher velocity from the shorter nozzle possible to employ when using a target gives a higher volume per minute than a jet issuing at a lower velocity from the longer nozzle required to be used to obtain the desired result in the absence of a target. To illustrate how important this is, attention is directed to the fourth column in Table VI which gives the volume of the issuing jets in c. c. per minute. These volumes, which represent the yield of processed pigment suspension per minute, are seen to drop off sharply with increase in nozzle length. Thus although the relatively long nozzles employed in the latter part of Table VI without targets give results equal to those obtained with short nozzles using targets, the long nozzles are relatively less efficient from the standpoint of production. Thus it is seen that from a practical standpoint, the use of a target is highly desirable. Moreover, for nozzles of large channel diameter, better results are obtained with a target than when such nozzles are used without targets. When large channel diameter nozzles are used with a target, the passage through the nozzle produces a lesser part of the effect, the target contributing the larger part of the effect. Thus, when pumping a large volume per minute, this circumstance permits the use of only one or at least a small number of such nozzles, with a target, instead of a large number of more expensive smaller diameter nozzles necessary to get the same intensity of effect without a target.

As a further comparison of the use of nozzles without a target and with a target, in this instance to show the effect of the diameter of the channel of nozzles employed in the range of relatively small channel diameters, tests are cited in Table VII, which for purposes of comparison, include also the tests from Table III. Here, as in Table VI, the tests are equivalent in all respects with the exception that in one series there was a target and in the other one there was no target. The length of nozzle channel in each case was ½", and where a target was used, it was of flat steel, the distance being ¼" from the end of the nozzle. The nozzles were of steel.

*Table VII*

| Test No. | Pressure, lbs. per sq. inch | Diameter of nozzle channel in inches | Speed of issuing jet, ft. per sec. | Use of target | Adhesive requirement, per cent | Per cent reduction in adhesive requirement, based on orig. as 100% |
|---|---|---|---|---|---|---|
| 1 | | | | | 22 | |
| 5 | 4,000 | 0.0232 | 583 | No | 20 | 9 |
| 22 | 4,000 | .0232 | 583 | Yes | 17 | 23 |
| 12 | 4,000 | .0174 | 493 | No | 18 | 18 |
| 29 | 4,000 | .0174 | 493 | Yes | 17 | 23 |
| 13 | 4,000 | .0131 | 510 | No | 18 | 18 |
| 30 | 4,000 | .0131 | 510 | Yes | 16 | 27 |

The results of the tests in Table VII confirm those of Table VI which showed that, with a relatively short nozzle, the use of a target gives better results than obtained without a target. Table VII also indicates that beyond the range of the extremely fine nozzles (such as e. g. one .0131" in channel diameter), the results with a target do not vary with increase in channel diameter of the nozzle. The results in Table VII, moreover, show that the differences between using a target and not using a target seem to be somewhat less as the diameter of the nozzle channel becomes smaller. This indicates, as pointed out above, that the effect of passage through the nozzle becomes greater with a smaller diameter of channel, and it thus follows that in such instances, the proportion of the effect obtained when a target is used, which is contributed by the impingement on the target, is proportionately less than with nozzles of larger channel diameter. However, inasmuch as nozzles of smaller channel diameter are not only more expensive than those of larger channel diameter such as referred to above, but are much more prone to possible plugging by grit which might be present in the pigment slurry passing through, and also naturally have a lower capacity, it is seen that the employment of a short nozzle of somewhat larger diameter with a target is a preferable practical procedure to the employment of a short nozzle of very small diameter without a target.

For purposes of further illustration, to show the effect of passage through other nozzles, equipped with a target, the tests in Table VIII are cited. The pigment comprising the artificially prepared calcium carbonate was the same as that employed in Table I, but of a slightly different slurry concentration, namely, at 215 grams per litre. The nozzle employed for Test No. 31 was a glass capillary tube, properly supported to withstand the pressure employed. It had a channel diameter of .0335" and was 21¾" long. The nozzle employed for Test No. 32 was a copper tube with a channel diameter of .0625" and was 292¼" long. The nozzle employed for Test No. 33 was the same copper tube as for Test No. 32, slightly shortened to 290¾", to the outer end of which was attached a steel tube with a channel of .0245" diameter, and a length of .28". The target in each case was of flat steel located ¼" distance from the end of the nozzle.

Table VIII

| Test No. | Pressure, lbs. per sq. inch | Speed of issuing jet, feet per sec. | Adhesive requirement, per cent | Per cent reduction in adhesive requirement, based on orig. as 100% |
|---|---|---|---|---|
| 1 | | | 22 | |
| 31 | 4,000 | 190 | 15 | 32 |
| 32 | 4,000 | 89 | 20 | 9 |
| 33 | 4,000 | 385 | 18 | 18 |

To illustrate the effect of varying target distances, the tests in Table IX are cited. For the first series of tests (Nos. 1, 34 and 35), the pigment comprising the artificially prepared calcium carbonate was the same as that employed in Table I, and of the same concentration. For the second series of tests (Nos. 36 to 39), the pigment was of the same composition as for the first series, but of a different commercial lot, and of a different concentration, 260 grams per litre in Test No. 37, and 252 grams per litre in Tests Nos. 38 and 39. In every case, the target employed was flat steel, and the nozzle was of steel.

Table IX

| Test No. | Pressure, lbs. per sq. inch | Diam. nozzle channel, inches | Length nozzle channel, inches | Distance target from end of nozzle, inches | Adhesive requirement, per cent | Per cent reduction in adhesive requirement, based on orig. as 100% |
|---|---|---|---|---|---|---|
| 1 | | | | | 22 | |
| 34 | 4,000 | 0.0245 | 0.28 | 0.125 | 15 | 32 |
| 35 | 4,000 | .0245 | .28 | .25 | 14 | 36 |
| 36 | | | | | 20 | |
| 37 | 4,100 | .0245 | .19 | .056 | 13 | 35 |
| 38 | 4,000 | .0245 | .19 | .25 | 11 | 45 |
| 39 | 4,100 | .0245 | .19 | .95 | 13 | 35 |

From Table IX it is seen that, when using nozzles of the channel diameters indicated, of those target distances tried, approximately ¼" gives the optimum results, both shorter and longer distances, approximately 1/16" and 1/8", and 1", giving somewhat less satisfactory results. The explanation of this is probably that if the target is placed too close it has the effect of impeding to some extent the flow of slurry from the nozzle and interfering with its proper striking of the target, while if the target is placed too far away, the diameter of the jet broadens somewhat, and this, together with the frictional resistance of the air, apparently results in an impact on the target of lesser effectiveness. Doubtless the optimum distance or the optimum range of distance of the target will vary with different diameters of nozzle channels employed, but it is evident that with any given nozzle channel diameter, there is some distance or range of distance, readily determinable by trial, which will give the optimum result.

I have tried a number of different materials for targets and it would appear that the harder the material the better, and probably for the same hardness, material which is tough is better than material which is brittle. For example, I have employed steel such as used in ordinary bolts, as well as file steel, the file marks of which had been ground off. I have also used a target of plate glass, but found that this did not give quite so good results as did the steel, either the relatively soft steel or the file steel. I have found that the jet marks a target very quickly even when the target is made of such hard material as file steel, and after a short time wears an impression in the target at the point of impact of the jet. Steel seems to erode considerably slower than does glass which apparently indicates as stated above, that a material which is brittle is a less satisfactory target material than one which is tough. I have also found that apparently the best results are obtained when the target is arranged at right angles, or nearly at right angles to the issuing jet. Under these conditions, of course, the effect of the impact is greatest. I have also found that when a jet impinges into a pit or hole which is already worn in a target, the results are not quite so good as when the jet hits a perfectly flat target. Therefore, as alluded to previously herein, it is desirable to use a target so arranged that it continuously offers a fresh surface to the impinging jet, the fresh surface being offered sufficiently rapidly to prevent a pit of any substantial size being worn in the target. This can be accomplished in commercial operation, conveniently by having a target move very slowly in front of the jet either continuously or with an intermittent action. A new surface is preferably presented every few minutes because when using a target of file steel, for example, and with a jet at 4000 lbs. pressure, an appreciable mark will be made on the target within that time. A number of mechanical arrangements might be employed, such as a disc target positioned substantially at right angles to the jet, preferably revolved in a spiral path in relation to the jet, or a flat target substantially at right angles to the jet moved in a reciprocating manner in relation to the jet but moving further sideways at each successive stroke to present a new target surface each time, or a cylindrical target of a diameter such as to present a reasonably flat surface to the jet with the jet impinging radially on the surface, and the cylinder revolving spirally, but maintaining the impingement of the jet radial to the surface, or a hollow cylindrical target similarly revolved with the jet impinging radially on the inside wall of the cylinder. Any such device is suitable, particularly as stated one which advances the target surface very slowly in front of the jet, maintaining the target substantially at right angles thereto, and this is the one I prefer to employ. After a target surface is pitted all over, it may be easily renewed merely by grinding the surface smooth again.

It is possible if desired to use with success target surfaces bearing various markings, scorings, serrations, ridges, unevennesses, patterns or the like, but my work so far indicates that a flat surface at right angles to the jet appears to give as good or better results. Moreover secondary, tertiary or other targets may be used, if desired, i. e., targets upon which the slurry, rebounding from the primary target, may impinge in one or more further impingements, but indications so far are that such additional targets add little, if any, to the efficiency of the process.

Doubtless targets of very hard materials other than those mentioned above herein, such as those made of the very hard steels such as manganese steels, nitrided steels, or of stellite, or of alundum or carborundum, or of the very hard carbides, borides, or the like, such for example as "carboloy," might be employed with satisfaction, but inasmuch as hardened steel such as file steel is relatively inexpensive, even though it is perhaps not quite so long wearing as some of the others mentioned, it is a convenient material to employ.

There are a number of other variables in the process which I have tested in order to determine the optimum conditions of operation, and among these, I shall mention, for illustrative purposes, the effect of the concentration of the slurry employed. Table X embodies the results of a series of tests employing as the pigment comprising artificially prepared calcium carbonate, material of the same composition as that employed in Table I, but of a different commercial lot. The nozzle employed was of steel and had a channel diameter of .0245" and a length of .31" in Tests Nos. 41, 42 and 43, and a length of .19" in Tests Nos. 44 and 45, a target of flat steel being employed in these tests at a distance of 1".

Table X

| Test No. | Pressure, lbs. per sq. inch | G. p. l. of pigment employed | Adhesive requirement, per cent | Per cent reduction in adhesive requirement based on original as 100% |
|---|---|---|---|---|
| 40 | | | 22 | |
| 41 | 4,200 | 50 | 17 | 23 |
| 42 | 4,100 | 103 | 16 | 27 |
| 43 | 4,100 | 150 | 15½ | 30 |
| 44 | 4,200 | 200 | 14½ | 34 |
| 45 | 4,250 | 263 | 14 | 36 |

It is seen from Table X that the effectiveness of my process increases with increasing concentration of the slurry employed, and it is therefore desirable from the standpoint of the intensity of the effect obtained as well as from the standpoint of the increased output obtained to employ a slurry as concentrated as possible. Thus, if feasible, I prefer to employ in my process a slurry as concentrated as can readily be pumped commercially. However, in those cases where the slurry is treated while in a stage of an operation in which the concentration is fixed by other considerations, it naturally is treated at the concentration so fixed, which, if the concentration is lower than the maximum which can be pumped, correspondingly reduces the efficiency of my process.

Another variable, the effect of which I have tested, is that of temperature. My process appears to give somewhat better results when the pigment is processed at a relatively low temperature than when it is processed at an elevated temperature. An example which illustrates this difference in results is given in Table XI, in which an already cited test, Test No. 35 (from Table IX), is compared with a companion test made with the same original pigment and under the same conditions, excepting only that the slurry was processed at a higher temperature.

efficiency is obtained by this procedure, although of course if other considerations require that the slurry be run hot, it can be so run in my process, but apparently with somewhat lesser efficiency.

I have also determined the effect of subjecting artificially prepared calcium carbonate to my process more than once. Table XII gives the result of two series of tests made to investigate this point. The material used in the first series (Tests Nos. 47–49) was artificially prepared calcium carbonate made in the causticizing process from high calcium lime and sodium carbonate, and was of a relatively fine particle size. It was run at a concentration of 234 g. p. l. The material used in the second series (Tests Nos. 50–57) was a pigment comprising artificially prepared calcium carbonate of the same composition as that employed in Table I, but of a different commercial lot. It was employed at a concentration of 258 g. p. l. In running both series of tests, a steel nozzle was employed, having a cylindrical channel of .0245" diameter and a length of .19", the target being a piece of flat steel located at ¼" from the end of the nozzle.

Table XII

| Test No. | Pressure, lbs. per sq. inch | Number times passed through process | Adhesive requirement, per cent | Per cent reduction in adhesive requirement, based on orig. as 100% |
|---|---|---|---|---|
| 47 | | | 37 | |
| 48 | 4,000 | 1 | 20 | 46 |
| 49 | 4,000 | 2 | 17 | 54 |
| 50 | | | 21 | |
| 51 | 4,000 | 1 | 15 | 29 |
| 52 | 4,000 | 2 | 12 | 43 |
| 53 | 4,000 | 3 | 12 | 43 |
| 54 | 4,000 | 4 | 9.5 | 55 |
| 55 | 4,000 | 5 | 10 | 52 |
| 56 | 4,000 | 6 | 10.5 | 50 |
| 57 | 4,000 | 7 | 10 | 52 |

From Table XII it is seen, that at 4000 lbs. pressure, with the nozzle employed, the first series shows that an improved effect is obtained by passing the material employed a second time through my process, while the second series shows that the material employed is further improved by still further passages through my process. The second series further shows that after about 4 passes under the conditions of test employed, a maximum result is obtained insofar as the percentage reduction of the adhesive requirement is concerned, and beyond that point no further reduction in adhesive requirement apparently occurs. Thus, up to a certain point, multiple passes appear to be advantageous. As it is more expensive to pass material through my process a number of times, the extra cost of processing must be balanced against the improvement obtained in order to determine how many times the material should be passed through the process in Table XI

| Test No. | Pressure, lbs. per sq. inch | Diameter nozzle channel, inches | Length nozzle channel, inches | Distance target from end of nozzle, inches | Temp. of processing slurry, °C. | Adhesive requirement, per cent | Per cent reduction in adhesive requirement, based on orig. as 100% |
|---|---|---|---|---|---|---|---|
| 1 | | | | | | 22 | |
| 35 | 4,000 | 0.0245 | 0.28 | 0.25 | 19½ | 14 | 36 |
| 46 | 4,000 | .0245 | .28 | .25 | 88 | 16 | 27 |

I therefore prefer to run my process with relatively cool slurries because apparently greater commercial practice. However, as even a small additional reduction in adhesive requirement constitutes a considerable saving, the cost of adhesive usually running from five to fifty times or more that of the artificially prepared calcium carbonate, it generally pays to process the artificially prepared calcium carbonate a sufficient number of times to obtain the maximum reduction in adhesive requirement.

It is also a fact that sometimes it is worth while to continue the number of passes beyond the point of maximum percentage reduction in adhesive requirement, as I have found that, in some instances at least, certain other characteristics of the pigment comprising artificially prepared calcium carbonate continue to improve beyond this point, for example, the gloss imparted to the paper. For instance, in Tests Nos. 50 to 57 shown in Table XII, the maximum percentage adhesive reduction was obtained after four passes, i. e., in Test No. 54. However, determinations of gloss performed on coated sheets similar to those on which the adhesive requirement tests were made, but after calendering the same, showed that the percent gloss increased steadily from the sheet coated with the original pigment (Test No. 50) up to and including the sheet coated with the pigment subjected to seven passes (Test No. 57). The actual percentage gloss determined on an "Ingersoll Glarimeter," for the individual Tests Nos. 50 to 57, representing zero passes to seven passes (see Table XII), was, respectively: 37.9; 43.1; 43.3; 46.2; 49.6; 51.1; 53.9; and 55.2. Therefore it is apparent that in some cases it may be advisable to proceed beyond the point of maximum percentage reduction in adhesive requirement in order to effect a further enhancement in some of the other characteristics of the artificially prepared calcium carbonate.

Another variable in my process which I have investigated is the effect of the pressure employed on the results obtained. Theoretically water flowing from an orifice has the velocity of a falling body which has fallen from a height equal to the head of water, that is to say its velocity in feet per second equals $$\sqrt{2gh}$$

where $g$ is the gravitational constant or 32.2, and $h$ the height in feet equal to the head of water. (See "Kent's Mechanical Engineers' Handbook," 10th ed., 1923, Wiley & Sons, Inc., N. Y., page 745; and "General Engineering Handbook," C. E. O'Rourke, 2nd ed., 1940, McGraw-Hill Book Co., N. Y., page 250.) Inasmuch as 1 lb. per sq. inch pressure is equal to 2.3 feet head of water, the velocity equals $$\sqrt{2g \times 2.3 \times \text{pressure in lbs. per sq. inch}}$$

or $$12.14\sqrt{\text{pressure in lbs. per sq. inch}}$$

Actually the velocity is less for a number of reasons, but the chief interest at this point is that the velocity increases only as the square root of the pressure.

Thus the velocity increases much less rapidly than does the pressure, and as high pressure pumps are very costly and increase in cost approximately proportionately to increase in pressure, it is naturally desirable to use as low a pressure as is feasible. This is also the case because of the great erosive effect of slurries at high pressures on pump valves, although as will be pointed out below, such erosion can be reduced to a practical minimum, if indeed not substantially eliminated, by taking special precautionary measures. As it is therefore desirable to use as low a pressure as may be feasible, the series of tests cited in Table XIII was made to determine the results obtainable at a number of pressures up to 4000 lbs. The material, artificially prepared calcium carbonate, was the same as Test No. 47, used at the same concentration, and the nozzle, target and target distance were the same as those employed in Tests Nos. 48 and 49 in Table XII. The material was run only once through in each test, a fresh sample of material being used, of course, in running each successive test.

*Table XIII*

| Test No. | Pressure, lbs. per sq. inch | Speed of issuing jet, ft. per sec. | Adhesive requirement, per cent | Per cent reduction in adhesive requirement based on orig. as 100% |
|---|---|---|---|---|
| 47 | | | 37 | |
| 54 | 1,000 | 348 | 31 | 16 |
| 58 | 2,000 | 374 | 25 | 32 |
| 59 | 3,000 | 478 | 22 | 41 |
| 60 | 4,000 | 578 | 20 | 46 |

From Table XIII, it is seen that employment of 1000 lbs. pressure gives an appreciable reduction in the casein requirement, but that the effect is improved with increase in pressure.

From a consideration of Tables XII and XIII it is seen that in general the per cent reduction in adhesive requirement increases with the number of times of processing, at least up to a certain point, and also increases with increase in pressure which of course increases the velocity. Therefore further detailed data is desirable on the effect of multiple passes at various pressures in order to determine: firstly, the approximate lower limit of pressure feasible to employ; secondly, whether or not even a very large number of passes at relatively low pressures can produce as intense an effect as a relatively smaller number of passes at higher pressures; and thirdly, the preferred conditions for commercial operation as to pressure and number of passes, taking into consideration both the intensity of the effect obtained and the cost of operation.

Table XIV summarizes a large number of tests made to determine these points. As will be apparent, it is extremely time-consuming to make tests involving multiple passes. It requires that a slurry of the pigment be fed to the high pressure pump, pumped through the nozzle (and against a target in the present instance) and the effluent collected. To make a second pass, the effluent of the first pass is fed into the inlet of the pump and the processing repeated. This procedure is repeated until the desired number of passes have been made. Samples for test are usually taken after each pass, or after certain numbered passes, as desired. I devised another method, however, to overcome the time-consuming feature of the above method, which enabled tests involving any desired number of passes to be made within a reasonable time. The equipment for this method consisted of the same high pressure pump, nozzle and target set-up previously employed, but in this instance the apparatus was so arranged that any desired proportion of the effluent from the nozzle, rather than its entire volume, could be allowed to flow from the system as finished product, the remainder of the effluent being delivered by gravity back into the inlet of the high pressure pump. In conjunction with this apparatus, there was employed a proportioning pump of a maximum capacity somewhat less than that of the high pressure pump. The proportioning pump could be regulated accurately to deliver any desired capacity below its maximum. The original slurry was fed into the inlet of the proportioning pump, and the outlet of the proportioning pump delivered into the inlet of the high pressure pump.

By delivering a measured volume per minute of the original slurry from the proportioning pump into the inlet of the high pressure pump, allowing an equal volume per minute of the effluent of the high pressure pump to flow from the system as finished product, and delivering the remainder of this effluent to the inlet of the high pressure pump, a continuous process resulted. For example, assuming a capacity of the high pressure pump of 4000 cc. per minute, and that the proportioning pump was regulated to deliver 2000 cc. per minute, and that 2000 cc. of finished product was allowed to flow out of the system from the effluent of the high pressure pump, the other 2000 cc. of effluent delivering to the inlet of the high pressure pump, this would mean that 2000 cc. of original slurry would be fed into the system per minute and 2000 cc. of final product would flow out of the system per minute, while 4000 cc. per minute was being processed in the system by the high pressure pump. When the system came to equilibrium after a short time, this would mean that the final product passing from the system had received the equivalent of two passes through the high pressure pump nozzle system. Similarly, if 400 cc. per minute of original slurry was fed in by the proportioning pump and 400 cc. per minute was drawn off from the nozzle effluent as final product, this final product would be equivalent to a product processed by 10 passes through the high pressure pump. Thus by properly proportioning the rate of feed from the proportioning pump, and drawing off a portion of the effluent from the high pressure pump nozzle equal in volume to the feed, a final product having made any desired number of passes through the nozzle could be obtained. The number of passes would be equivalent to the quotient resulting from dividing the volume pumped per minute by the high pressure pump by the volume per minute delivered to it by the proportioning pump (or what is the same volume, namely, that flowing from the system as finished product).

In order to have the system reach equilibrium, i. e., to produce a constant quality of final product as quickly as possible, it is desirable to have the internal capacity of the system as low as feasible. Thus the inlet container feeding the high pressure pump was made very small—in fact just enough head of feed being maintained to feed the pump properly without the possibility of sucking in air—and in this manner equilibrium could be quickly reached. Actually in each test made in this manner, considerably more time was allowed before taking a sample of the effluent than was calculated to be necessary to reach the equilibrium, in order definitely to insure that the product would be representative of the number of passes desired. At the start of the process the high pressure pump system was filled, before diverting part of its effluent from the system.

In the drawing, I have illustrated, diagrammatically, in elevation, a flow chart of the above assembly of apparatus, with the addition of a cooler, to be referred to later herein. Numeral 1 represents a supply pipe for delivering slurry, in the direction of the arrow, in controlled volume, as from a proportioning pump (not shown) or other means, into inlet container 2, discharging through inlet pipe 3, in the direction of the arrow, into the inlet end of high pressure pump 4. High pressure pump 4 discharges the slurry under pressure through outlet pipe 5, in the direction of the arrow, through nozzle 6 against target 7 into container 8. Container 8 is provided with bottom outlet pipe 9, through which slurry passes, in the direction of the arrow, either into pipe 11, controlled by valve 12, or into pipe 13, controlled by valve 14, or into both pipes 11 and 13, discharging therefrom through pipe 15, in the direction of the arrow, into inlet container 2. Container 8 is additionally provided with side outlet pipe 10, discharging slurry, in the direction of the arrow, out of the system. Cooling jacket 16 surrounds pipe 11. By properly regulating valves 12 and 14, none, any portion or all of the slurry discharged through bottom outlet pipe 9 may be passed through pipe 11 and thus cooled by cooling jacket 16. Target 7 may be removed, if it be desired to operate without a target.

In operation, a given volume per minute of slurry is continuously delivered into the system through supply pipe 1, pumped into container 8, and delivered back into inlet container 2. In a short time high pressure pump 4 will be operating at its full capacity and the level of slurry then rises in inlet container 2. Valves 12 and 14 are then adjusted to maintain the slurry in inlet container 2 at a constant level, whereupon the slurry level in container 8 rises until it reaches outlet pipe 10, from whence slurry begins to discharge, and, after equilibrium is reached, discharges continuously at the same volume per minute as is delivered into the system through supply pipe 1. Mutual regulation of valves 12 and 14, while maintaining a fixed constant flow from pipe 15, controls the degree of cooling.

Of the tests cited in Table XIV, Tests Nos. 19, 38, 51, 52, 54, 61–63, 65, 72 and 75–78 were run by the original method, and Tests Nos. 66–71, 73, 74 and 79–86, were run by the continuous method above described. The pigment comprising artificially prepared calcium carbonate employed for all the tests was calcium carbonate magnesium hydroxide, of the same composition as that employed in the tests of Table I. Several different commercial samples of this pigment were employed. As will be noted in Table XIV, the tests are arranged in several groups, starting respectively with Tests Nos. 36, 50, 1, and 64, each of which tests represents a different sample of the original pigment employed for that particular group of tests. The target used was a steel plate located .25″ from the end of the nozzle in all cases. It was necessary in many cases to use nozzles with channels of different diameters to deliver the proper volumes at the various pressures employed in the tests cited. These are shown in Table XIV. The tests are arranged substantially in the order of decreasing pressures, except for Test No. 65, which is slightly out of place, but was put in its position in order to group it with the other tests made on the same original sample, namely, on Test No. 64. As shown in Table XIV the concentrations of the slurry employed varied from 215 to 258 grams per litre, but as indicated in Table X above, variation within these limits does not have a great effect on the results.

Table XIV

| Test No. | Pressure, lbs. per sq. inch | Number of passes | Speed issuing jet, ft. per sec. | Diam. nozzle channel, inches | Length nozzle channel, inches | G. p. l. pigment employed | Adhesive requirement, per cent | Per cent reduction in adhesive requirement, based on original as 100% |
|---|---|---|---|---|---|---|---|---|
| 36 | | | | | | | 20 | |
| 61 | 5,100 | 1 | 650 | 0.0245 | 0.19 | 252 | 11 | 45 |
| 38 | 4,000 | 1 | 557 | .0245 | .19 | 252 | 11 | 45 |
| 50 | | | | | | | 21 | |
| 51 | 4,000 | 1 | 619 | .0245 | .19 | 258 | 15 | 29 |
| 52 | 4,000 | 2 | 638 | .0245 | .19 | 258 | 12 | 43 |
| 54 | 4,000 | 4 | 648 | .0245 | .19 | 258 | 9.5 | 55 |
| 1 | | | | | | | 22 | |
| 19 | 4,000 | 1 | 532 | .0245 | .01 | 224 | 15 | 32 |
| 62 | 4,000 | 1 | (¹) | .0245 | ².2 | 215 | 15.5 | 29 |
| 63 | 4,000 | 2 | (¹) | .0245 | ².2 | 215 | 13 | 41 |
| 64 | | | | | | | 23 | |
| 65 | 4,130 | 1 | 556 | .0277 | .25 | 225 | 19 | 17 |
| 66 | 2,910 | 5 | 471 | .0308 | .23 | 221 | 15 | 35 |
| 67 | 2,013 | 5 | 377 | .0348 | .25 | 233 | 17 | 26 |
| 68 | 1,975 | 10 | 383 | .0348 | .25 | 221 | 16 | 30 |
| 69 | 1,665 | 5 | 335 | .0373 | .25 | 216 | 16 | 30 |
| 70 | 1,553 | 10 | 331 | .0373 | .25 | 221 | 17 | 26 |
| 71 | 1,388 | 10 | 297 | .0385 | .25 | 225 | 15 | 35 |
| 72 | 1,365 | 1 | 267 | .0426 | .25 | 222 | 20 | 13 |
| 73 | 1,318 | 20 | 315 | .0385 | .25 | 225 | 15 | 35 |
| 74 | 1,303 | 5 | 315 | .0385 | .25 | 216 | 18 | 22 |
| 75 | 1,240 | 5 | 271 | .0426 | .25 | 222 | 17 | 26 |
| 76 | 1,176 | 12 | 271 | .0426 | .25 | 222 | 16.5 | 28 |
| 77 | 1,155 | 16 | 271 | .0426 | .25 | 222 | 15 | 35 |
| 78 | 1,139 | 30 | 271 | .0426 | .25 | 221 | 15.5 | 33 |
| 79 | 975 | 20 | 243 | .0426 | .25 | 221 | 17.5 | 24 |
| 80 | 960 | 10 | 243 | .0426 | .25 | 221 | 19 | 17 |
| 81 | 570 | 10 | 184 | .0510 | .30 | 221 | 17 | 26 |
| 82 | 560 | 20 | 184 | .0510 | .30 | 221 | 17 | 26 |
| 83 | 523 | 30 | 184 | .0510 | .30 | 221 | 17 | 26 |
| 84 | 137 | 20 | 100 | .0697 | .30 | 221 | 20 | 13 |
| 85 | 137 | 30 | 100 | .0697 | .30 | 221 | 19 | 17 |
| 86 | 66 | 129 | 62 | .0687 | .25 | 221 | 20 | 13 |

¹ Not determined.
² Several nozzles used varying from about .2″ to about .3″ in length of channel.

While Table XIV presents the tests in a logical sequence, the arrangement in order of decreasing pressures given therein renders it rather difficult to draw directly therefrom conclusions to the points listed in the paragraph immediately following Table XIII above. Therefore, Table XV is presented in which the tests of Table XIV are rearranged in the order of decrease of the percentage reduction in adhesive requirement. For sake of simplicity Table XV omits the data on the original materials used, as well as the data on nozzle channel diameters and lengths, concentration of material employed, and percentage adhesive requirement.

Table XV

| Test No. | Pressure, lbs. per sq. inch | Number of passes | Speed of issuing jet, ft. per sec. | Per cent reduction in adhesive requirement, based on orig. as 100% |
|---|---|---|---|---|
| 54 | 4,000 | 4 | 648 | 55 |
| 61 | 5,100 | 1 | 650 | 45 |
| 38 | 4,000 | 1 | 557 | 45 |
| 52 | 4,000 | 2 | 638 | 43 |
| 63 | 4,000 | 2 | | 41 |
| 66 | 2,910 | 5 | 471 | 35 |
| 71 | 1,388 | 10 | 297 | 35 |
| 73 | 1,318 | 20 | 315 | 35 |
| 78 | 1,139 | 20 | 271 | 35 |
| 79 | 975 | 20 | 243 | 33 |
| 19 | 4,000 | 1 | 532 | 32 |
| 68 | 1,975 | 10 | 383 | 30 |
| 69 | 1,665 | 5 | 335 | 30 |
| 51 | 4,000 | 1 | 619 | 29 |
| 62 | 4,000 | 1 | | 29 |
| 77 | 1,155 | 16 | 271 | 28 |
| 67 | 2,013 | 5 | 377 | 26 |
| 70 | 1,553 | 10 | 331 | 26 |
| 75 | 1,240 | 5 | 271 | 26 |
| 76 | 1,176 | 12 | 271 | 26 |
| 82 | 560 | 20 | 184 | 26 |
| 83 | 523 | 30 | 184 | 26 |
| 80 | 960 | 10 | 243 | 24 |
| 74 | 1,303 | 5 | 315 | 22 |
| 65 | 4,130 | 1 | 556 | 17 |
| 81 | 570 | 10 | 184 | 17 |
| 85 | 137 | 30 | 100 | 17 |
| 72 | 1,365 | 1 | 267 | 13 |
| 84 | 137 | 20 | 100 | 13 |
| 86 | 66 | 129 | 62 | 13 |

Table XV shows that it requires an excessively large number of passes, in this case 129, to get an appreciable percentage reduction in adhesive requirement at as low a pressure as 66 lbs. per sq. inch, but that 20 to 30 passes are sufficient to give an appreciable result at 137 lbs. pressure, while 10 passes give this result at 570 lbs. However, it additionally shows that even a substantial number of passes at a low pressure, for example, at 137 lbs., does not produce an effect of very great intensity, the effects of greater intensity being produced by considerably higher pressures.

In order to illustrate the efficiency of the process, Table XV has been rearranged as Table XVI, incorporating additionally a new column therein listing the relative efficiencies of the several tests. Other things being equal, the power required in my process varies directly as the pressure, and also varies directly as the number of passes. Thus the product of the pressure in lbs. per sq. inch and the number of passes will give a figure representing the relative power required in any given test. If, then, the percentage reduction in adhesive requirement is divided by the above figure, the quotient will represent the percentage reduction in adhesive requirement per unit of power required. As such a figure is a small decimal fraction, it is convenient to multiply it by 1000 to give a figure which is more readily handled. The efficiency figure is thus 1000 times the percentage reduction in adhesive requirement divided by the product of the pressure in lbs. per sq. inch and number of passes. Table XVI shows the tests rearranged in the order of their efficiency.

Table XVI

| Test No. | Pressure, lbs. per sq. inch | Number of passes | Speed of issuing jet, ft. per sec. | Per cent reduction in adhesive requirement, based on original as 100% | Efficiency |
|---|---|---|---|---|---|
| 38 | 4,000 | 1 | 557 | 45 | 11.2 |
| 72 | 1,365 | 1 | 267 | 13 | 9.5 |
| 61 | 5,100 | 1 | 650 | 45 | 8.8 |
| 19 | 4,000 | 1 | 532 | 32 | 8.0 |
| 51 | 4,000 | 1 | 619 | 29 | 7.3 |
| 62 | 4,000 | 1 | | 29 | 7.3 |
| 52 | 4,000 | 2 | 638 | 43 | 5.4 |
| 63 | 4,000 | 2 | | 41 | 5.1 |
| 84 | 137 | 20 | 100 | 13 | 4.7 |
| 75 | 1,240 | 5 | 271 | 26 | 4.2 |
| 65 | 4,130 | 1 | 556 | 17 | 4.1 |
| 85 | 137 | 30 | 100 | 17 | 4.1 |
| 69 | 1,665 | 5 | 335 | 30 | 3.6 |
| 74 | 1,303 | 5 | 315 | 22 | 3.4 |
| 54 | 4,000 | 4 | 648 | 55 | 3.4 |
| 81 | 570 | 10 | 184 | 17 | 3.0 |
| 67 | 2,013 | 5 | 377 | 26 | 2.6 |
| 71 | 1,388 | 10 | 297 | 35 | 2.5 |
| 80 | 960 | 10 | 243 | 24 | 2.5 |
| 66 | 2,910 | 5 | 471 | 35 | 2.3 |
| 82 | 560 | 20 | 184 | 26 | 2.3 |
| 76 | 1,176 | 12 | 271 | 26 | 1.8 |
| 79 | 975 | 20 | 243 | 33 | 1.7 |
| 70 | 1,553 | 10 | 331 | 26 | 1.7 |
| 83 | 523 | 30 | 184 | 26 | 1.7 |
| 68 | 1,975 | 10 | 383 | 30 | 1.6 |
| 78 | 1,139 | 20 | 271 | 35 | 1.5 |
| 77 | 1,155 | 16 | 271 | 28 | 1.5 |
| 86 | 66 | 129 | 62 | 13 | 1.5 |
| 73 | 1,318 | 20 | 315 | 35 | 1.3 |

An examination of Table XVI indicates that in order to get the highest efficiency it is in generaly desirable to use high pressures with a relatively small number of passes, but that lower pressures and larger number of passes may be employed with some sacrifice of efficiency. Table XVI also shows that the efficiencies of the tests vary widely. Among other things, it is noted by comparison of the efficiencies of the tests made at the same pressure but with a different number of passes, that the efficiency falls off very rapidly as the number of passes increases. However, there is something besides efficiency to consider and that is the intensity of effect which is the basic reason for conducting the process. Therefore a test which shows high efficiency but shows a relatively small intensity of effect is of small practical importance. From a practical standpoint it is convenient to eliminate from consideration those tests in which the percentage reduction in adhesive requirement is below some arbitrary fixed value, in the present instance, for example, below a figure of 20, because other things being equal, the highest intensity of effect, that is to say, the greatest percentage reduction in adhesive requirement, is the important desideratum. Based on this viewpoint, Table XVII has been prepared which is the same as Table XVI with the exception that all tests have been omitted in which the percentage reduction in adhesive requirement is below 20 (this resulting in the omission of tests 65, 72, 81, and 84-86 from Table XVI).

Table XVII

| Test No. | Pressure, lbs. per sq. inch | Number of passes | Speed of issuing jet, ft. per sec. | Per cent reduction in adhesive requirement, based on original as 100% | Efficiency |
|---|---|---|---|---|---|
| 38 | 4,000 | 1 | 557 | 45 | 11.2 |
| 61 | 5,100 | 1 | 650 | 45 | 8.8 |
| 19 | 4,000 | 1 | 532 | 32 | 8.0 |
| 51 | 4,000 | 1 | 619 | 29 | 7.3 |
| 62 | 4,000 | 1 | | 29 | 7.3 |
| 52 | 4,000 | 2 | 638 | 43 | 5.4 |
| 63 | 4,000 | 2 | | 41 | 5.1 |
| 75 | 1,240 | 5 | 271 | 26 | 4.2 |
| 69 | 1,665 | 5 | 335 | 30 | 3.6 |
| 54 | 4,000 | 4 | 648 | 55 | 3.4 |
| 74 | 1,303 | 5 | 315 | 22 | 3.4 |
| 67 | 2,013 | 5 | 377 | 26 | 2.6 |
| 71 | 1,388 | 10 | 297 | 35 | 2.5 |
| 80 | 960 | 10 | 243 | 24 | 2.5 |
| 66 | 2,910 | 5 | 471 | 35 | 2.3 |
| 82 | 560 | 20 | 184 | 26 | 2.3 |
| 76 | 1,176 | 12 | 271 | 26 | 1.8 |
| 79 | 975 | 20 | 243 | 33 | 1.7 |
| 70 | 1,553 | 10 | 331 | 26 | 1.7 |
| 83 | 523 | 30 | 184 | 26 | 1.7 |
| 68 | 1,975 | 10 | 383 | 30 | 1.6 |
| 78 | 1,139 | 20 | 271 | 35 | 1.5 |
| 77 | 1,155 | 16 | 271 | 28 | 1.5 |
| 73 | 1,318 | 20 | 315 | 35 | 1.3 |

Table XVII shows that the tests made at pressures below approximately 500 lbs. have now been eliminated. In order to carry this matter a step further and to illustrate the bases on which are decided the preferred conditions for commercial operation as to pressure and number of passes, taking into consideration both intensity of effect obtained and efficiency, Table XVIII is presented as the final table of this series. Here are listed only those tests in which the percent reduction in adhesive requirement is 30% or more, as such a reduction is preferred commercially. (This results in the omission of Tests 51, 62, 67, 70, 74-77, 80, 82 and 83 from Table XVII.)

Table XVIII

| Test No. | Pressure, lbs. per sq. inch | Number of passes | Speed of issuing jet, ft. per sec. | Per cent reduction in adhesive requirement, based on original as 100% | Efficiency |
|---|---|---|---|---|---|
| 38 | 4,000 | 1 | 557 | 45 | 11.2 |
| 61 | 5,100 | 1 | 650 | 45 | 8.8 |
| 19 | 4,000 | 1 | 532 | 32 | 8.0 |
| 52 | 4,000 | 2 | 638 | 43 | 5.4 |
| 63 | 4,000 | 2 | | 41 | 5.1 |
| 69 | 1,665 | 5 | 335 | 30 | 3.6 |
| 54 | 4,000 | 4 | 648 | 55 | 3.4 |
| 71 | 1,388 | 10 | 297 | 35 | 2.5 |
| 66 | 2,910 | 5 | 471 | 35 | 2.3 |
| 79 | 975 | 20 | 243 | 33 | 1.7 |
| 68 | 1,975 | 10 | 383 | 30 | 1.6 |
| 78 | 1,139 | 20 | 271 | 35 | 1.5 |
| 73 | 1,318 | 20 | 315 | 35 | 1.3 |

Examination of Table XVIII indicates that a reduction in adhesive requirement of approximately one-third may be obtained by the use of pressures of approximately 1000 lbs. or somewhat higher providing multiple passes are employed, usually in the neighborhood of 10 to 20 passes or more. Even greater reductions in adhesive requirement may be obtained if higher pressures are used, such as 4000 or 5000 lbs., and in many such cases one pass is sufficient; but it is usually better to employ multiple passes in small number, say from 2 to 4, providing the desired intensity of effect is not obtained with one pass.

The whole matter of pressure and number of passes may be summarized in general as follows from the illustrative data presented: pressures as low as 66 lbs. per square inch can be considered as essentially without practical utility, because they require an excessively large number of passes (e. g. 129) to produce an appreciable effect, such as a reduction in adhesive requirement of from 10 to 15% or thereabouts; pressures upwards of 100 lbs. or thereabouts, for example 137 lbs., however, require a substantial, but very much smaller number of passes (e. g. about 20 to 30) to give an appreciable effect, and these pressures may have some degree of practical utility, but it is relatively minor and limited by the fact that even a substantial number of passes at such relatively low pressures does not produce as intense an effect as a smaller number of passes at higher pressures. By the use of pressures from approximately 500 to the vicinity of 1000 lbs., a reduction in adhesive requirement of about 20% or somewhat more can be obtained with a substantial number of passes, for example about 20 to 30; but in order to obtain a reduction in adhesive requirement of about 30% or more, it is desirable to employ a pressure of approximately 1000 lbs. or somewhat more, preferably employing 10 to 20 passes or thereabouts. Such results, and even considerably better results, are obtainable by using still higher pressures, for instance up to around 4000 or 5000 lbs., with either a single pass or a small number of passes, for example, from 2 to 4. As to efficiency, my process is in general most efficient when high pressures are employed, and at any given pressure the efficiency usually decreases with increase in number of passes.

I have stated above that high pressure pumps are expensive. This is particularly true of pumps in a pressure range above 1500 or 1800 lbs. per sq. inch. Moreover I have also stated previously that the use of slurries in high pressure pumps, which are practically exclusively of the reciprocating type, causes great difficulty with valve wear, unless special precautions are taken. Ordinary pump valves, even of such hard material as stellite or hardened alloy steels wear out very rapidly. This difficulty may, however, be overcome to a large extent, or even practically eliminated, by employing valves which are provided with a rubber sealing device in conjunction with the metal valve (for valves of this type, see for example the book entitled "Pumps" by Kristal & Annett, McGraw-Hill Book Co. Inc., N. Y., 1940, pages 33 and 34). These valves are used in so-called "slush" pumps employed in oil fields to pump large quantities of slurry at pressures as high as 1000, or even 1500 to 1800 lbs. However, to my knowledge the elimination of erosion on long operation by use of these special valves has been definitely proven only with pumps using pressures up to about 1500 or 1800 lbs., and although these valves would also appear to be satisfactory for pumps operating at 4000 to 5000 lbs. pressure, I do not know of any data yet available on prolonged operation of such valves with slurries in pumps at such pressures.

Thus taking into consideration cost of pumping units and the valve situation outlined above, as well as the data presented herein, from a practical standpoint, I prefer to practice my process employing a "slush" pump equipped with the type of valves described, operating at pressures from about 1000 to 1800 lbs., which gives a speed of issuing jet of about 250 to about 360 ft. per second, and at from about 10 to 30 passes, rather than to employ the very high pressure pumps, although such preferred operation is in many cases relatively somewhat less efficient from a power standpoint, and may not produce quite so intense an effect. If prolonged operation with the type of valve mentioned proves successful in the very high pressure pumps, it will probably be desirable at such time to adopt the higher pressure pumps and use, for example, a pressure of 4000 lbs. and a lesser number of passes, say 1 to 4, because of greater efficiency and more intense effect thereby obtained. For a nozzle I prefer the cylindrical channel type as the simplest and easiest to construct, of a channel diameter sufficiently large to deliver the required volume at the operating pressure employed, and of a length approximately 5 to 10 times channel diameter. Or I may, if I desire, use a group of nozzles having a total combined capacity equal to that required. I prefer to use a target, positioned substantially at right angles to the issuing jet and spaced at the optimum distance from the orifice of the nozzle. This distance varies with nozzle channel diameter but may readily be determined in a few trials, starting, for example, with a target distance of about ten times the nozzle channel diameter from the orifice of the nozzle, and then trying other distances both somewhat less and somewhat more until the optimum distance is determined.

As has been previously pointed out, the speed of discharge increases with increase of pressure, but very much less slowly, and in an attempt to increase the efficiency of the process I designed several "opposed" nozzles, one of which I shall describe for purposes of illustration. This was in the shape of a U (with an inlet at the outside bottom of the U); from each of the inside upper ends of which, from a cylindrical channel, issued a stream, one directly opposite the other, the streams impinging head on exactly upon one another. In this manner I was able to obtain a speed of impact double that with which the individual streams at the same pressure would of themselves hit a target. However, I found that such nozzles did not produce an effect much, if any, better, and in some cases not so good, as obtained at the same pressure with a single nozzle stream directed against a target, and thus I concluded that although "opposed" nozzles or a group of nozzles where two or more streams impinge upon one another in order to increase the speed of impact, may be employed, nevertheless their use seems to offer little or no advantage. The probable reason for this seems to be that the impact of a stream of slurry against a hard solid material, such as steel, gives considerably better results than its impact against another stream of slurry, which does not appear to act as or have the effect of a target.

From the above it would also appear that discharging a stream of slurry from a nozzle, either directly, or after passage through air, into a body of water or other liquid, such as a body of slurry, is similar to discharging a stream of slurry from a nozzle directly into the atmosphere without the use of a target, with the exception that the effect obtained by direct discharge into a body of liquid might not be of quite so intense a degree because of the retarding effect of the body of liquid on the issuance of the jet.

I have given above examples of the effect of my process on pigments comprising artificially prepared calcium carbonate such as calcium carbonate itself, made by the causticizing process, and calcium carbonate magnesium hydroxide. I cite in Table XIX a few more examples of artificially prepared calcium carbonate subjected to my process, the calcium carbonate being produced in several different ways.

All tests so far reported herein have been conducted on material which is prepared in wet form and subjected to my process in wet form, prior to use or prior to drying. My process is also applicable to pigment comprising artificially prepared calcium carbonate which has been prepared in wet form and then dried. Artificially prepared calcium carbonate dried before use ordinarily gives somewhat poorer results both in coated and filled paper because, among other things, of the fact that the fine particles apparently more or less agglomerate on drying, and it is difficult if not impossible under usual conditions of reincorporating them with water, to disperse the particles to their original condition. I have pointed this out in detail in my prior Patent No. 2,189,832, issued February 13, 1940. The use of such dried artificially prepared calcium carbonate usually results, for example, in obtaining a coated paper of lower degree of finish than would otherwise be obtained, and may also result in the calcium carbonate requiring less adhesive, but this lowering of the adhesive requirement by drying is of relatively small value because of the accompanying depreciation in the other characteristics imparted to the paper by the calcium carbonate. However, a considerable quantity of artificially prepared calcium carbonate is produced in dry form for use, and such calcium carbonate is amenable to treatment by my process, whereby the dry pigment, which may be already of somewhat lower adhesive requirement than the original pigment as it was prepared in wet form is still further reduced in adhesive requirement by subjection to my process after mixing with water to give a slurry, with an accompanying improvement in other qualities of the material so processed, that is to say, in its finishing properties and the like. For purposes of illustration, an example of previously dried pigment comprising artificially prepared calcium carbonate treated by my process is included in Table XIX.

I have stated previously herein that my process is applicable only to artificially prepared calcium carbonate and not to naturally occurring calcium carbonate. In order to illustrate this, I also include in Table XIX a test on a naturally occurring calcium carbonate sold commercially and produced from a good grade of limestone by very fine grinding and separation.

In all cases in Table XIX, except for the original samples, the material was processed by one passage at about 4000 lbs. pressure through a nozzle having a cylindrical channel about .025" in diameter and about .3" long against a steel target ¼" distant from the end of the nozzle. The materials of the several samples were processed at concentration varying from 223 to 207 g. p. l. Tests 87, 89, 91 and 93, are of course original materials used respectively in Tests 88, 90, 92 and 94.

Table XIX

| Test No. | Material | Condition | Method of preparation | Adhesive requirement, per cent | Per cent reduction in adhesive requirement, based on orig. as 100% |
|---|---|---|---|---|---|
| 87 | Calcium carbonate | In original wet condition. | Lime and carbon dioxide. | 45 | |
| 88 | do | do | do | 25 | 44 |
| 89 | do | do | Lime and carbon dioxide (conditions of manufacture different from those of test 87). | 18 | |
| 90 | do | do | do | 11 | 39 |
| 91 | Calcium carbonate magnesium hydroxide | Originally produced wet, then dried, then remixed with water. | Dolomitic lime and sodium carbonate. | 13 | |
| 92 | do | do | do | 10 | 23 |
| 93 | Calcium carbonate | Limestone ground wet, then dried, then remixed with water. | Grinding limestone | 5.5 | |
| 94 | do | do | do | 5.5 | 0 |

I have cited the use of a pump as a suitable instrumentality for impelling a slurry through a nozzle at high speed. Likewise a chamber in which pressure of a gas operates to expel a slurry therefrom through a nozzle may be employed, or any other device which is suitable for causing a stream of slurry to pass through a nozzle at considerable velocity.

I have described the operation of my process, when employing only one pass, by feeding a slurry to the inlet of a pressure imparting device, such as a pump, discharging it through a nozzle, preferably against a target, and then passing the slurry out of the system. The slurry may be fed to the pump by any desired feeding arrangement, and after passing through the nozzle may be led to any desired point for use or for further processing. This of course applies either to a batch or continuous process. In the operation of my process where more than one pass is employed, I have described the use of a device such as a pump, in a batch process, to force a slurry through a nozzle. After a given volume of slurry has been passed through once, it is returned to the inlet of the pump and passed through the nozzle a second time. This process is repeated until a sufficient number of passes have been made. A simple apparatus for practicing this procedure is to employ an inlet tank to contain a supply of slurry to feed to the pump and have the effluent from the nozzle deliver into an outlet tank of volume similar to that of the inlet tank.

After one passage through the nozzle, the slurry may either be transferred from the outlet tank into the inlet tank, or, by proper piping, the outlet tank may serve as the inlet tank on the second pass, the effluent from the nozzle being delivered into the original inlet tank; and then this situation may be reversed for each subsequent pass until the required number of passes are obtained. Both tanks are preferably provided with suitable agitators. Or the equipment involving a proportioning pump in addition to the high pressure pump, which I describe above prior to Table XIV, and which was used in running part of the tests cited in that table, may be employed. In this case a feed of a certain volume per minute is maintained by the proportioning pump into the inlet of the high pressure pump, the high pressure pump (of a capacity larger than the proportioning pump) being run in such a way as to return part of its effluent to its own inlet, while discharging from the system as finished product the remainder of its effluent in volume per minute equal to that supplied by the proportioning pump. The number of passes is the quotient obtained by dividing the capacity per minute of the high pressure pump by the volume per minute of slurry fed in by the proportioning pump. This method is adapted to a continuous process, and is my preferred procedure when operating my process as a continuous process.

Another way of conducting my process with multiple passes, which is very simple, and also effective, is to run the process as a batch instead of a continuous process and provide only one tank containing the slurry. This is my preferred procedure when operating my process as a batch process. The tank is preferably provided with an agitator and the slurry may be drawn off as from a valve at the bottom of the tank into a high pressure pump and then pumped through the nozzle back into the same tank. In this way the slurry is circulated by the pump through the nozzle back into the tank, and the time required to make one pass is the quotient obtained by dividing the volume of the slurry in the tank by the volume per minute discharged by the pump through the nozzle. For example, if the tank contains 1000 gallons and the pump has a capacity of 100 gals. per minute, it will require 10 mins. to make one pass. By running the pump for the required number of minutes, any given number of passes may be made, for example, if the pump is run 100 mins., this is equivalent to 10 passes. In this way any number of passes may be obtained with the employment of very simple apparatus. Moreover the process may be made continuous instead of batch, if, after the tank of slurry has been given the desired number of passes, the pump is kept in operation, and there is fed into the tank a given volume per minute of original slurry, and the same volume per minute of effluent from the nozzle is diverted from the system as final product, the volume of slurry to be fed in per minute being the quotient obtained by dividing the capacity per minute of the pump by the desired number of passes.

Inasmuch as a substantial proportion of the energy employed in the process is converted into heat, it is desirable to take this into consideration in operating the process. When employing a single pass, the heat generated is usually not sufficient to require any special precautions, but when employing multiple passes, particularly where a large number of passes is employed, it is usually desirable to make some provision for dissipating the heat evolved, both in the continuous and in the batch processes described. If a tank be employed, and this is very large in proportion to the volume pumped per minute, the natural convection currents may dissipate the heat sufficiently, but generally it is necessary to provide some cooling device. In either the continuous or the batch system, this may take the form of a cooler, suitably a water cooler, operating at some point in the system through which the slurry passes; or it may take the form of a water jacket with which one or more of the tanks employed may be provided, and through which cold water may circulate. As an illustration of a cooler, cooling jacket 16 is shown in the drawing.

As has been indicated in Table X, my process is relatively the more efficient, the higher the concentration employed, and I naturally prefer under these conditions to run it at as high a concentration as feasible, but the pumping apparatus, particularly the reciprocating type which is most suitable to employ, imposes a practical limit on the concentration of the slurry which may be used, because beyond a certain point, depending on the particular slurry and the particular pump used, a pump will not pump the slurry satisfactorily. I have, however, devised a method by which a slurry of a higher concentration than is normally feasible can be pumped.

This method consists in making up the slurry of the pigment comprising artificially prepared calcium carbonate and water with a "thinning agent," i. e., an agent adapted to reduce the viscosity of the mix. I have found that there are a number of suitable thinning agents such, for example, as protein, proteinaceous material, protein-like material, or protein derivatives, for instance casein; modified starches such as "Feculose ETO," "Feculose O," "Hercules Gum," "Satin Gum 35"; or pectin, dextrin, sodium silicate, and the like. The most effective and the best thinning agent, particularly from the standpoint of the use of the pigment in coated paper, is casein, and that is the one which I preferably use, but of course any agent capable of exerting a thinning action may be employed. Only a relatively small amount of the thinning agent is required, usually from ¼% to 5% on the calculated dry weight of the pigment comprising artificially prepared calcium carbonate, although more may be used if desired. Casein, conveniently dissolved in an alkaline solvent, is added to a paste comprised of water and pigment comprising artificially prepared calcium carbonate, in an amount from about one-half to three percent on the dry weight of pigment present, and this thins the paste down to a consistency at which it flows and may be pumped. This is not merely the result of adding to the paste the amount of water which may be associated with the thinning agent in question, as the addition of that amount of water to the paste in the absence of a thinning agent does not bring about the desired reduction in viscosity. As an example of the striking effect of the use of such thinning agents, I can cite a certain quality of calcium carbonate magnesium hydroxide with which it is not feasible to employ a concentration much if any higher than 300 g. p. l. of slurry when employing a high pressure plunger pump with bevel valves without getting into difficulties by the failure of the valves to work properly; but by the expedient of employing about 1% of casein based on the weight of the dry calcium carbonate magnesium hydroxide in the slurry, it is possible to employ concentrations as high as 700 to 750 g. p. l. with the same pump.

It is apparent that this enables a very marked advance in efficiency to be obtained. Each pigment comprising artificially prepared calcium carbonate, according to its composition, physical condition, particle size and the like will be found to require a somewhat different minimum percentage of thinning agent such as casein, in order to show a satisfactory reduction in viscosity. I have found, however, that in general less than ¼ of 1% of the thinning agent is usually ineffective, whereas one half to three quarters of one percent, up to 1%, is usually very effective. Moreover the viscosity continues to be lowered somewhat by further additions, for example, up to 2% or somewhat higher, but it is usually convenient not to go much above 2 or 3% because the higher the percentage, at least when casein is used as the thinning agent, the more tendency there is toward foaming, although this is not the case with other thinning agents such as modified starches for example. Thus my preferred range of operation is to employ between ½% and 2% of thinning agent, and my preferred thinning agent, at least for pigment to be used for coated paper or for cold water paints, is casein, dissolved in a suitable solvent such as sodium carbonate and ammonia, the weight of casein used being calculated on the dry weight of the pigment comprising the artificially prepared calcium carbonate used. This enables me to use slurries of very high concentration, and where the pigment comprising the artificially prepared calcium carbonate is to be used in coated paper or in cold water paints or the like, the casein employed may serve as part of the adhesive which would subsequently be added prior to use.

I have stated in the earlier part of this specification that pigment comprising artificially prepared calcium carbonate subjected to my process possesses desirable characteristics such as lower adhesive requirement and lower oil absorption, and I have illustrated in great detail the lowered adhesive requirement exhibited by a large number of samples treated by my process. For the purpose of illustrating the reduction of oil absorption, I list in Table XX a number of the samples already referred to above, on which oil absorption tests have also been performed. In Table XX, as will be apparent, Tests Nos. 1, 36, 40, 47 and 50 are the original samples from which the group immediately following each of these tests was prepared.

Table XX

| Test No. | Pressure, lbs. per sq. inch | Number of passes | Use of target | Oil absorption | Reduction in oil absorption based on original as 100% |
|---|---|---|---|---|---|
| 1 | | | | 31.7 | |
| 2 | 4,000 | 1 | No | 29.2 | 8 |
| 14 | 4,000 | 1 | do | 28.9 | 9 |
| 18 | 4,000 | 1 | do | 28.9 | 9 |
| 19 | 4,000 | 1 | Yes | 29.2 | 8 |
| 31 | 4,000 | 1 | do | 28.9 | 9 |
| 32 | 4,000 | 1 | do | 31.1 | 2 |
| 33 | 4,000 | 1 | do | 29.2 | 8 |
| 34 | 4,000 | 1 | do | 29.5 | 7 |
| 35 | 4,000 | 1 | do | 28.6 | 10 |
| 46 | 4,000 | 1 | do | 27.9 | 12 |
| 36 | | | | 29.1 | |
| 37 | 4,100 | 1 | Yes | 27.1 | 7 |
| 38 | 4,000 | 1 | do | 27.8 | 4 |
| 39 | 4,100 | 1 | do | 26.7 | 8 |
| 40 | | | | 32.1 | |
| 41 | 4,200 | 1 | Yes | 28.2 | 12 |
| 42 | 4,100 | 1 | do | 27.8 | 13 |
| 43 | 4,100 | 1 | do | 29.2 | 9 |
| 44 | 4,200 | 1 | do | 29.6 | 8 |
| 45 | 4,250 | 1 | do | 29.6 | 8 |

Table XX—Continued

| Test No. | Pressure, lbs. per sq. inch | Number of passes | Use of target | Oil absorption | Reduction in oil absorption based on original as 100% |
|---|---|---|---|---|---|
| 47 | | | | 45.8 | |
| 48 | 4,000 | 1 | Yes | 40.1 | 12 |
| 49 | 4,000 | 2 | do | 38.2 | 17 |
| 58 | 1,000 | 1 | do | 43.0 | 6 |
| 59 | 2,000 | 1 | do | 39.7 | 13 |
| 60 | 3,000 | 1 | do | 38.9 | 15 |
| 50 | | | | 31.7 | |
| 51 | 4,000 | 1 | Yes | 27.1 | 15 |
| 52 | 4,000 | 2 | do | 27.7 | 13 |
| 53 | 4,000 | 3 | do | 26.0 | 18 |
| 54 | 4,000 | 4 | do | 26.4 | 17 |
| 55 | 4,000 | 5 | do | 25.9 | 18 |
| 56 | 4,000 | 6 | do | 26.9 | 16 |
| 57 | 4,000 | 7 | do | 25.7 | 19 |

I have previously stated herein that ordinary pump valves wear out rapidly in my process and therefore a special type of a rubber insert valve is preferably employed to give satisfactory service. I have also stated that targets wear out rapidly unless very hard materials are used, or suitable provision is made for exposing new surfaces at short intervals. These is one other portion of the apparatus I employ which is subject to severe wear and that is the nozzles. Of course nozzles of relatively small channel diameter wear out more rapidly for a a given volume discharged than do nozzles of relatively large channel diameter because of the relatively larger surface exposed per unit area in the nozzles of smaller channel diameters. Although when used without a target, the smaller channel diameter nozzles are more efficient, nevertheless when used with a target, nozzles of smaller channel diameters are not more efficient but rather show approximately the same efficiency as nozzles of larger channel diameters, and thus with a target, the larger channel diameter, and thus longer wearing, nozzles may be efficiently used, and as I prefer to use a target in the practice of my process, I preferably employ these larger channel diameter nozzles. The choice of the larger channel diameter nozzles is also indicated because of the fact that the larger volumes used commercially require only one or a few larger channel diameter nozzles, instead of a larger number of small ones. I also prefer to use relatively short nozzles usually as short as the nozzles may be made conveniently taking into consideration their mechanical requirements such as threaded end for attachment or the like. The nozzle or nozzles used, of course, are chosen with respect to delivering the desired capacity at the pressure employed. However, even with nozzles of larger channel diameters, the wear is very severe and if soft metal such as bronze is employed, the wear is extremely rapid. Even ordinary cast iron or steel wears with considerable rapidity, and therefore I prefer to use extremely hard metals such as the alloy steels, or suitable steel or iron which has been treated by some process to harden it such as by nitriding, carburizing, flame hardening, or the like. I also may use nozzles made of the extremely hard material, such as the borides or carbides of metals, or of other very hard substances such as alundum or carborundum if they can be drilled or formed to give a nozzle of the desired channel diameter. At the other extreme, since rubber and certain other relatively soft resilient substances are very resistant to abrasion, a nozzle having a channel lined with such material might be used, if a nozzle lining of such material could be made which would not be injured or unduly distorted by the pressure employed.

I may, if desired, carry out my process either at atmospheric, superatmospheric or subatmospheric pressure, that is, in respect to the pressure of the gas, such as air, surrounding the jet as it leaves the nozzle. Superatmospheric pressure surrounding the nozzle would appear to give no decided advantage, but subatmospheric pressure might be of some advantage due to the removal of any air resistance to the jet. However, this involves mechanical complications, and would not appear to be justified practically, especially when dealing with warm slurries. I therefore prefer to operate at substantially atmospheric pressure in respect to the space into which the jet discharges.

By utilizing artificially prepared calcium carbonate processed according to my invention as a pigment in the coating of coated paper, I have obtained coated paper which has a strong coating, although there was used substantially less, for example, about 10 to 60% less adhesive on the basis of the processed calcium carbonate than was required to obtain a strong coating on paper when using the same calcium carbonate prior to treatment by my process, and in some cases even a greater percentage reduction of adhesive requirement was indicated. The coated paper produced possesses also, among other characteristics, a markedly improved gloss or finish, as well as a markedly improved whiteness and brightness. The coating applied may be of any weight desired from very light to very heavy as is customary in the art, including the light weight coatings used to make so-called "surface filled" papers, "filmed" or "film coated" paper, "machine coated" paper, and the like.

Coated paper produced as above described is of excellent quality, embodying the qualities resulting from the desirable characteristics of the calcium carbonate from which the processed calcium carbonate was made, such in certain cases as fine particle size, ability to take a high finish, good spreading qualities, opacity, high brightness, and excellent ink receptivity, and combining therewith the hitherto non-existent feature, namely, a low adhesive content, and giving a more opaque, better finished paper of improved printing qualities. As stated above, the gloss obtained as well as the brightness is also greatly enhanced. Moreover the decreased oil absorption of the pigment imparts this characteristic to the coated paper, thus improving the printing qualities by giving cleaner and sharper printing results because of lesser ink requirement, and also rendering the coated paper more suitable for varnishing purposes, if it be desired to employ varnish, because of lesser absorption of the varnish. Thus the coated paper possesses unique characteristics different from those of any paper hitherto made with the same calcium carbonate prior to processing.

The illustrative series of tests showing the percentage of adhesive requirements given herein were as stated performed with casein (derived from milk), the adhesive most commonly used in the manufacture of paper. However, similar percentage reduction in adhesive requirement of pigment comprising artificially prepared calcium carbonate processed by my method may be obtained with other adhesives employed in the paper coating industry such as starch, either unmodified, or more usually in some modified form, glue, gums, or protein, proteinaceous, protein-like or protein containing adhesive derived from other sources such as soya bean, corn (zein), and the like, casein (derived from milk) in modified, combined or soluble form, as well as other materials useful as adhesives in coated paper.

As also stated previously, pigment comprising artificially prepared calcium carbonate processed as described herein may be advantageously used as a filler in the manufacture of filled paper. In my preferred manufacture of such paper, the calcium carbonate is processed as described herein, preferably with a thinning agent other than casein, such e. g. as a modified starch.

Although there has not yet been time to investigate the filled paper field to the same extent that the coated paper field has been investigated, the indications are that filled paper produced with my processed artificially prepared calcium carbonate is more opaque than is paper made with the same calcium carbonate without processing, that a better finish is obtained, and that in some cases dusting is lessened or avoided. It may be stated in this connection that in certain instances, notably with paper having groundwood furnishes run on high speed paper machines, a certain amount of dusting has been experienced on the calenders, winders and rewinders with paper in which artificially prepared calcium carbonates of certain characteristics have been used as fillers. This dust has been found to contain fibre as well as calcium carbonate. The indications are that the herein described processing of the calcium carbonates in question lessens or avoids this difficulty, resulting in an improved manufacturing process as well as an improved paper.

Moreover, filled paper hitherto produced with artificially prepared calcium carbonate always has had a more or less "chalky" feel, which in some cases has been very objectionable. Attempts have been made to overcome this feel in certain cases by incorporation of other fillers such as clay with the artificially prepared calcium carbonate, in other cases by more severe calendering, and in still other cases by some form of surface sizing, but none of these expedients has given a paper which has exactly the same sort of feel as that possessed by clay filled paper. Paper made with artificially prepared calcium carbonate and possessing the feel of clay filled paper is greatly to be desired, and there are indications that paper made with artificially prepared calcium carbonate processed as described herein possesses a lesser degree of chalky feel than has been the case with any previously produced paper filled with pigment comprising artificially prepared calcium carbonate, if in fact the present paper does not entirely lack the usual chalky feel. The great value of such improvement is readily apparent.

Pigment comprising artificially prepared calcium carbonate processed as herein described may be employed in paints and enamels or the like, as well as in rubber, plastics, and similar materials. For such industries, I prefer to employ the pigment comprising artificially prepared calcium carbonate in dry form, preferably after it has been coated with material such for example as rosin, stearic or lauric acid, or other materials, e. g. those mentioned in my copending application previously referred to herein. The rosin coating is more particularly employed when the pigment is for use in the paint and enamel industry, while the stearic or lauric acid coating is more particularly employed when the pigment is for use in the rubber industry. The coating may be applied to the pigment before or after subjecting to my process, as desired. Paints, enamels, and the like made with the pigment processed as herein described flow and brush well, give a durable film, of excellent strength, elasticity, and gloss, all of which are desirable characteristics in this class of product. The rubber articles produced have superior characteristics imparted by the use of the pigment processed as herein described.

I have indicated above that the pigment comprising artificially prepared calcium carbonate processed as described herein may be employed in cold water paints. Cold water paints employing such pigments may be made as usual by mixing the pigment and adhesive, together with other pigments if desired, and will be found to require less adhesive, and to give a more opaque, better spreading, and smoother paint films than obtained with the use of the same pigment comprising calcium carbonate prior to treatment.

In the manufacture of commodities such as coated paper and the like, as well as cold water paints, the outstanding characteristic of lower adhesive requirement of artificially prepared calcium carbonate processed according to my procedure will be recognized by one skilled in the art as of great importance technically as well as economically. From a technical standpoint, it will be apparent that it is now possible to manufacture coated papers containing a given artificially prepared calcium carbonate with a lesser percentage of adhesive than has hitherto been feasible with the same calcium carbonate, and a brighter, higher finishing, more opaque and better printing coated paper is thereby obtained, as well as one which is more economical to produce. The economy effected is proportionately very large, particularly as the cost per pound of adhesive is usually greatly in excess of the cost per pound of the calcium carbonate.

As will also be apparent to one skilled in the art, the reduction of the oil absorption of artificially prepared calcium carbonate resulting from my process is of technical as well as economic importance. This will be readily understood when it is appreciated that at least in most paints, which of course comprise fundamentally a pigment and a vehicle, a low oil absorption characteristic in the calcium carbonate used is highly desirable because the calcium carbonate is normally of very much less cost per unit of weight than is the vehicle, and when calcium carbonate has a low oil absorption, more of it in proportion to the vehicle can be used in a given mix, while still maintaining the low viscosity, good flowability and brushability desirable in a paint, enamel, lacquer or the like.

Thus, other characteristics and properties being equal, calcium carbonate with a low oil absorption has a much higher economic value for such use than has calcium carbonate of a higher oil absorption. In fact, in certain cases it is not feasible to market to the paint, enamel, and lacquer trade certain artificially prepared calcium carbonates possessing otherwise satisfactory characteristics solely because they have a high oil absorption, and my process thus makes it feasible to extend the market for such calcium carbonates to fields from which they have hitherto been excluded.

The paper coating tests to determine adhesive requirement recorded herein were made according to the test customarily used in the art for the purpose, employing the "Dennison" series of numbered waxes. Where a strong coating is referred to herein, it is meant that the coating in question shows no pick on Dennison No. 3 wax, but gives a slight pick on Dennison No. 4 wax.

The oil absorption test used followed substantially the so-called "standard rub-out method" for determining the oil absorption of pigments. This type of test is described in detail in "Physical and Chemical Examination of Paints, Varnishes, Lacquers and Colors," by Henry A. Gardner, 6th edition, October 1933, pages 475-7. Although the oil absorption test is probably not accurate to within more than one unit, if in some cases it is that accurate, the figures in the tenths place are given as determined.

I have not yet determined the cause or causes of the striking modification of the properties of artificially prepared calcium carbonate brought about by its subjection to my process, but my theory is that it is due to some change which takes place in the surface characteristics of the individual particles. It may be that the physical, chemical, electrical, or other condition of the calcium carbonate particles has been altered. After processing artificially prepared calcium carbonate which originally has a reasonably fine particle size, it appears to be only slightly reduced if at all in particle size by subjection to my process. The particle size of some of the relatively coarses artificially produced calcium carbonates may be reduced to a somewhat greater degree. But any such reduction in particle size of artificially prepared calcium carbonate as may occur in my process is believed to have no bearing on the striking modification of the properties noted, as I have found that artificially prepared calcium carbonates in general do not display a change in properties such as shown herein with slight or even moderate change in particle size. In fact, so far as adhesive requirement of any given pigment is concerned, it is considered that, as a general rule, this tends to increase rather than decrease as particle size becomes smaller.

My processed artificially prepared calcium carbonate, while embodying the new and highly desirable characteristics such as lower adhesive requirement, lower oil absorption and the like, nevertheless retains or even exhibits in an enhanced degree, the otherwise wholly desirable properties which it may have possessed prior to processing, such as its fineness of particle size, its uniformity of particle size and shape, its settling characteristics, its good opacity, good brightness, high whitening value, good covering power, softness, smoothness and lack of abrasiveness, good finishing properties, good ink receptivity, good body, good spreading and brushing characteristics, and the like.

In respect to power requirement for my process, this will depend, as indicated above herein, on the pressure at which the process is run and on the number of passes. It may be roughly estimated as follows: it requires about 2 to 3 H. P. to pump one gallon of slurry per minute through a nozzle of the appropriate size at about 4000 lbs. pressure. As the power required is approximately proportional to the pressure employed, the power required to pump one gallon per minute at, for example, 1000 lbs. pressure would thus be approximately ½ to ¾ H. P. The power required at other pressures may be similarly calculated. The power required is also proportional to the number of passes, and thus can be computed directly after the number of passes has been determined upon.

In respect to yield, this may be determined directly by multiplying the number of gallons delivered from the system per minute by the number of pounds of dry pigment per gallon present in the slurry. As explained, the most economical procedure is to use as concentrated a slurry as possible and the greatest yields are obtained, as well as the greatest economy in power, when a thinning agent is used, so that a slurry of very high concentration may be employed.

As stated previously herein the slurries I employ may in some cases be very concentrated. Such very concentrated slurries sometimes are thixotropic, i. e., they may set or become apparently solid on standing, but be restored to a liquid condition upon some semblance of a liquid condition upon vigorous agitation. Also some of the slurries may be extremely thick up to the point where a pump may just be able to handle them. I have described a reciprocating pump as a suitable high pressure pump to employ in the practice of my process. Such a pump may be of several types such for example as the plunger type or the piston type, but there is a certain limit of thickness of slurry or mud that such a pump will handle, which is usually limited by the valves, which eventually fail to function properly when the slurry or mud gets too thick. For slurries or muds thicker than such a pump will ordinarily handle, there are other pumps available, although usually they cannot be procured to operate at such high pressures as may be desired, but can be used to operate in the lower ranges. For example, the "Blackmer," the "Moyno" and diaphragm type pumps may be used, as these will handle very heavy slurries and muds, even up to where they may be in a semi-paste condition.

Thus where in the claims I use the word slurry, I mean it to include mixtures comprising the pigment in question and water throughout the entire range of liquidity, not only readily flowable slurries, but also extremely thick and viscous slurries up to the point where they may approach or be in the plastic or almost pasty condition, the only limitation being the capability of a suitable pump to pump them.

It is stated herein, just prior to Table V, that the target used in the tests thereof was arranged with its surface substantially at right angles to the direction of the issuing jet. This arrangement of the target also applies to the position of the target in all the other tests recorded herein where a target was employed.

Where in the claims, in relation to a target, I use the expression "spaced from the orifice of said nozzle" I mean that the target is situated sufficiently close to the orifice of said nozzle and in a suitable position to produce an effect such as described herein by the impingement of the pigment thereon, and preferably that the target is situated at the optimum distance from the orifice of the nozzle, and substantially at right angles to the direction of the issuing jet.

In this specification I have advanced one or more theories as partial or complete explanation of various conditions and effects, but it is to be distinctly understood that the scope of my invention is independent of theory, and that my invention is not limited or affected by the above theories or any of them, or by their validity or invalidity, as regardless of these or any other theories, the facts are as stated herein.

While the use of a target in the present process is disclosed and broadly claimed herein, no claims are made herein specifically to the use of a moving target also disclosed herein, said latter subject matter being likewise disclosed in my copending application Serial No. 449,492, filed July 2, 1942, and claimed therein; and cross reference is hereby made to said copending application. Cross reference is also hereby made to my copending application Serial No. 479,373, filed March 16, 1943, disclosing and claiming machines and methods wherein a jet or jets is or are struck by a rotor element.

While I have described in detail the preferred embodiment of my invention, it is to be understood that the details of procedure, the proportions of ingredients, the arrangement of steps, and the mechanical devices used, are presented for purposes of illustration only, and may be widely varied without departing from the spirit of my invention or the scope of the subjoined claims.

I claim:

1. The method of modifying a pigment comprising artificially prepared calcium carbonate which comprises passing a slurry comprising said pigment and water through a nozzle at a velocity of not less than 100 feet per second until a reduction is effected in the adhesive requirement of said pigment to not more than 90% of its original value.

2. The method of modifying a pigment comprising artificially prepared calcium carbonate which comprises passing a slurry comprising said pigment and water through a nozzle at a velocity of not less than 100 feet per second until a reduction is effected in the oil absorption of said pigment to not more than 95% of its original value.

3. The method of modifying a pigment comprising artificially prepared calcium carbonate which comprises passing a slurry comprising said pigment, water and one selected from the group of thinning agents consisting of casein, modified starch and sodium silicate, through a nozzle at a velocity of not less than 100 feet per second until a reduction is effected in the adhesive requirement of said calcium carbonate to not more than 90% of the original value.

4. The method of modifying a pigment comprising artificially prepared calcium carbonate which comprises passing a slurry comprising said pigment and water through a nozzle at a velocity of not less than 100 feet per second against a target spaced from the orifice of said nozzle until a reduction is effected in the adhesive requirement of said calcium carbonate to not more than 90% of its original value.

5. The method of modifying artificially prepared calcium carbonate which comprises passing a slurry comprising said calcium carbonate, water, and not less than about .5% casein (based on the dry weight of said calcium carbonate) in solution form, through a nozzle at a velocity of not less than 100 feet per second against a target spaced from the orifice of said nozzle until a reduction is effected in the adhesive requirement of said calcium carbonate to not more than 90% of its original value.

6. The method of modifying artificially prepared calcium carbonate which comprises passing a slurry comprising said calcium carbonate and water through a nozzle at a pressure of not less than 100 pounds per square inch against a target spaced from the orifice of said nozzle until a reduction is effected in the adhesive requirement of said calcium carbonate to not more than 90% of its original value.

7. The method of modifying a pigment comprising artificially prepared calcium carbonate which comprises pumping a slurry comprising said pigment and water through a nozzle at a pressure of not less than 100 pounds per square inch against a target spaced from the orifice of said nozzle, returning said slurry to the inlet of the pump and again pumping it at not less than said pressure through said nozzle against said target until a reduction is effected in the adhesive requirement of said calcium carbonate to not more than 90% of its original value.

8. The method of modifying a pigment comprising artificially prepared calcium carbonate which comprises pumping a slurry comprising said pigment and water through a nozzle at a pressure of not less than 100 pounds per square inch against a target spaced from the orifice of said nozzle, returning said slurry to the inlet of the pump and again pumping it at not less than said pressure through said nozzle against said target, and repeating the procedure of the immediately preceding clause until a predetermined reduction is effected in the adhesive requirement of said pigment, at least part of the heat engendered in said slurry being removed by cooling means.

HAROLD R. RAFTON.